United States Patent
Hubner et al.

(10) Patent No.: US 11,051,445 B2
(45) Date of Patent: *Jul. 6, 2021

(54) SEEDING SYSTEM

(71) Applicant: Deere & Company, Moline, IL (US)

(72) Inventors: Cary S. Hubner, Geneseo, IL (US); Elijah B. Garner, Bettendorf, IA (US); James R. Peterson, Moline, IL (US); Nathan A. Mariman, Geneseo, IL (US); Dnyanesh Dhobale, Pune (IN)

(73) Assignee: DEERE & COMPANY, Moline, IL (US)

(*) Notice: Subject to any disclaimer, the term of this patent is extended or adjusted under 35 U.S.C. 154(b) by 145 days.

This patent is subject to a terminal disclaimer.

(21) Appl. No.: 16/020,586

(22) Filed: Jun. 27, 2018

(65) Prior Publication Data

US 2020/0000012 A1    Jan. 2, 2020

(51) Int. Cl.
*A01C 7/08*     (2006.01)
*A01C 7/10*     (2006.01)
*A01C 7/12*     (2006.01)

(52) U.S. Cl.
CPC ............... *A01C 7/084* (2013.01); *A01C 7/082* (2013.01); *A01C 7/102* (2013.01); *A01C 7/127* (2013.01)

(58) Field of Classification Search
CPC ........... A01C 7/084; A01C 7/081; A01C 7/08; A01C 7/00; A01C 7/082; A01C 7/12; A01C 7/10; A01C 7/127
See application file for complete search history.

(56) References Cited

U.S. PATENT DOCUMENTS

| 13,986 A | 12/1855 | Hurd |
|---|---|---|
| 2,141,044 A | 12/1938 | Rassman |

(Continued)

FOREIGN PATENT DOCUMENTS

| CA | 2154022 A1 | 7/1996 |
|---|---|---|
| CA | 2485250 C | 2/2014 |

(Continued)

OTHER PUBLICATIONS

European Search Report issued in European Patent Application No. 19176476.0 dated Feb. 19, 2020 (10 pages).

(Continued)

*Primary Examiner* — Christopher J. Novosad
(74) *Attorney, Agent, or Firm* — Michael Best & Friedrich LLP

(57) ABSTRACT

A seeding machine for a row unit includes a rotatable seed disk with a plurality of apertures through which an air pressure differential is applicable to retain seed thereon. A seed delivery apparatus includes an elongated housing having a first opening through which seed is received, a second opening through which seed exits, and an elongated interior chamber. The seed delivery apparatus further includes a first pulley, a second pulley, and an endless member driven by the first pulley and/or the second pulley. The endless member is movable within the elongated interior chamber to receive seed from the first opening and convey seed to the second opening. The endless member is further positioned to sweep across a portion of the seed disk, which is controllable to angularly accelerate cooperatively with movement of the endless member to facilitate movement of a retained seed by the endless member from the seed disk.

20 Claims, 26 Drawing Sheets

(56) References Cited

U.S. PATENT DOCUMENTS

| | | |
|---|---|---|
| 2,250,719 A | 7/1941 | McKahin |
| 2,462,276 A | 2/1949 | Mueller |
| 2,960,258 A | 11/1960 | Dodwell |
| 3,122,283 A | 2/1964 | Walters |
| 3,154,032 A | 10/1964 | Kappelmann |
| 3,156,201 A | 11/1964 | Tweedale |
| 3,176,636 A | 4/1965 | Wilcox et al. |
| 3,208,413 A | 9/1965 | Dinges |
| 3,343,507 A | 9/1967 | Smith |
| 3,526,344 A | 9/1970 | Koning |
| 3,552,601 A | 1/1971 | Hansen et al. |
| 3,648,631 A | 3/1972 | Fielder et al. |
| 3,773,224 A | 11/1973 | Winslow |
| 3,880,100 A | 4/1975 | Gillies et al. |
| 3,889,883 A | 6/1975 | Anderson |
| 3,913,503 A | 10/1975 | Becker |
| 3,923,206 A | 12/1975 | Gillies et al. |
| 3,976,214 A | 8/1976 | Etwell |
| 4,022,266 A | 1/1977 | Beebe |
| 4,008,826 A | 2/1977 | Carree |
| 4,010,778 A | 3/1977 | Aggen |
| 4,023,509 A | 5/1977 | Hanson |
| 4,029,235 A | 6/1977 | Grataloup |
| 4,156,395 A | 5/1979 | Edwards et al. |
| 4,193,523 A | 3/1980 | Koning |
| 4,221,305 A | 9/1980 | Freeman et al. |
| 4,314,514 A | 2/1982 | Binder |
| 4,324,347 A | 4/1982 | Thomas |
| 4,600,122 A | 7/1986 | Lundie et al. |
| 4,646,941 A | 3/1987 | Grosse-Scharmann et al. |
| 4,915,258 A | 4/1990 | Olson |
| 5,170,909 A | 12/1992 | Lundie et al. |
| 5,533,458 A | 7/1996 | Bergland et al. |
| 5,936,234 A | 8/1999 | Thomas et al. |
| 6,024,033 A | 2/2000 | Kinkead et al. |
| 6,202,944 B1 | 3/2001 | McCrory |
| 6,237,514 B1 | 5/2001 | Romans |
| 6,305,303 B1 | 10/2001 | Wright et al. |
| 6,332,413 B1 | 12/2001 | Stufflebeanm et al. |
| 6,352,042 B1 | 3/2002 | Martin et al. |
| 6,567,764 B2 | 5/2003 | Kaji et al. |
| 6,651,570 B1 | 11/2003 | Thiemke |
| 6,681,706 B2 | 1/2004 | Sauder et al. |
| 7,086,269 B2 | 8/2006 | Sauder et al. |
| 7,185,596 B2 | 3/2007 | Thiemke et al. |
| 7,343,868 B2 | 3/2008 | Stephens et al. |
| 7,448,334 B2 | 11/2008 | Mariman et al. |
| 7,490,565 B2 | 2/2009 | Holly |
| 7,631,606 B2 | 12/2009 | Sauder et al. |
| 7,661,377 B2 | 2/2010 | Keaton et al. |
| 7,726,251 B1 | 6/2010 | Peterson et al. |
| 7,854,205 B2 | 12/2010 | Beaujot |
| 7,918,168 B2 | 4/2011 | Garner et al. |
| 7,975,631 B2 | 7/2011 | Heiss, Jr. |
| 8,001,913 B2 | 8/2011 | Snipes et al. |
| 8,074,586 B2 | 12/2011 | Garner et al. |
| 8,413,371 B2 | 4/2013 | Davidson et al. |
| 8,468,960 B2 | 6/2013 | Garner et al. |
| 8,543,238 B2 | 9/2013 | Straeter |
| 8,618,465 B2 | 12/2013 | Tevs et al. |
| 8,671,856 B2 | 3/2014 | Garner et al. |
| 8,746,159 B2 | 6/2014 | Garner et al. |
| 8,789,482 B2 | 7/2014 | Garner et al. |
| 8,800,457 B2 | 8/2014 | Garner et al. |
| 8,813,663 B2 | 8/2014 | Garner et al. |
| 8,843,281 B2 | 9/2014 | Wilhelmi et al. |
| 8,850,995 B2 | 10/2014 | Garner et al. |
| 8,850,997 B2 | 10/2014 | Silbernagel et al. |
| 8,985,037 B2 | 3/2015 | Radtke et al. |
| 9,144,190 B2 | 9/2015 | Henry et al. |
| 9,216,860 B2 | 12/2015 | Friestad et al. |
| 9,237,687 B2 | 1/2016 | Sauder et al. |
| 9,258,939 B2 | 2/2016 | Borgmann et al. |
| 9,258,940 B2 | 2/2016 | McCloskey |
| 9,301,441 B2 | 4/2016 | Friestad et al. |
| 9,313,943 B2 | 4/2016 | Zumdome et al. |
| 9,332,689 B2 | 5/2016 | Baurer et al. |
| 9,345,189 B2 | 5/2016 | Harmelink et al. |
| 9,445,539 B2 | 9/2016 | Rans |
| 9,468,142 B2 | 10/2016 | Bastin et al. |
| 9,480,199 B2 | 11/2016 | Garner et al. |
| 9,578,802 B2 | 2/2017 | Radtke et al. |
| 9,622,402 B2 | 4/2017 | Kinzenbaw et al. |
| 9,633,491 B2 | 4/2017 | Wonderlich |
| 9,635,802 B2 | 5/2017 | Rains et al. |
| 9,635,804 B2 | 5/2017 | Carr et al. |
| 9,686,905 B2 | 6/2017 | Garner et al. |
| 9,686,906 B2 | 6/2017 | Garner et al. |
| 9,699,955 B2 | 7/2017 | Garner et al. |
| 9,713,298 B2 | 7/2017 | Garner |
| 9,730,377 B2 | 8/2017 | Kowalchuk |
| 9,733,634 B2 | 8/2017 | Prickel |
| 9,769,978 B2 | 9/2017 | Radtke |
| 9,775,279 B2 | 10/2017 | Garner et al. |
| 9,807,922 B2 | 11/2017 | Garner et al. |
| 9,807,924 B2 | 11/2017 | Garner et al. |
| 9,814,176 B2 | 11/2017 | Kowalchuk |
| 9,820,429 B2 | 11/2017 | Garner et al. |
| 9,839,178 B2 | 12/2017 | Garner et al. |
| 9,861,025 B2 | 1/2018 | Schaefer et al. |
| 9,888,622 B2 | 2/2018 | Henry |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,949,426 B2 | 4/2018 | Radtke et al. |
| 9,974,230 B2 | 5/2018 | Sauder et al. |
| 10,051,782 B2 | 8/2018 | Wilhelmi et al. |
| 10,058,023 B2 | 8/2018 | Conrad et al. |
| 10,165,724 B2 | 1/2019 | Nilson et al. |
| 10,206,325 B2 | 2/2019 | Schoeny et al. |
| 10,257,973 B2 | 4/2019 | Hubner et al. |
| 10,296,017 B2 | 5/2019 | Schoeny et al. |
| 10,433,476 B2 | 10/2019 | Jagow et al. |
| 10,448,561 B2 | 10/2019 | Schoeny et al. |
| 10,485,159 B2 | 11/2019 | Wilhelmi et al. |
| 10,524,410 B2 | 1/2020 | Schoeny et al. |
| 10,537,055 B2 | 1/2020 | Gresch et al. |
| 10,582,655 B2 | 3/2020 | Kowalchuk |
| 10,602,656 B2 | 3/2020 | Bartelson et al. |
| 2003/0159631 A1 | 8/2003 | Sauder et al. |
| 2006/0283363 A1 | 12/2006 | Wollman et al. |
| 2008/0053352 A1 | 3/2008 | Friestad |
| 2010/0192818 A1 | 8/2010 | Garner et al. |
| 2010/0192819 A1 | 8/2010 | Garner et al. |
| 2010/0300341 A1 | 12/2010 | Peterson et al. |
| 2015/0238003 A1 | 8/2015 | Swane |
| 2016/0050842 A1 | 2/2016 | Sauder |
| 2016/0143213 A1 | 5/2016 | Kowaichuk |
| 2016/0174458 A1 | 6/2016 | Thacker |
| 2017/0049040 A1 | 2/2017 | Kinzenbaw |
| 2018/0153094 A1 | 2/2018 | Radtke et al. |
| 2018/0153096 A1 | 6/2018 | Garner et al. |
| 2018/0184578 A1 | 7/2018 | Stuber |
| 2018/0192577 A1 | 7/2018 | Smith et al. |
| 2019/0098827 A1 | 4/2019 | Gilbert et al. |
| 2019/0098828 A1 | 4/2019 | Wilhelmi et al. |
| 2019/0219606 A1 | 7/2019 | Radtke et al. |
| 2019/0223372 A1 | 7/2019 | Koch et al. |
| 2019/0230846 A1 | 8/2019 | Koch et al. |
| 2019/0239425 A1 | 8/2019 | Garner et al. |
| 2019/0239426 A1 | 8/2019 | Garner et al. |
| 2019/0246551 A1 | 8/2019 | Campbell et al. |
| 2019/0289774 A1 | 9/2019 | Prystupa et al. |
| 2019/0289778 A1 | 9/2019 | Koch et al. |
| 2019/0307057 A1 | 10/2019 | Sauder et al. |
| 2019/0343037 A1 | 11/2019 | Werner et al. |
| 2019/0364724 A1 | 12/2019 | Radtke et al. |
| 2020/0000017 A1 | 1/2020 | Marler, III et al. |
| 2020/0000018 A1 | 1/2020 | Boetsch |

FOREIGN PATENT DOCUMENTS

| | | |
|---|---|---|
| CA | 2806410 C | 8/2017 |
| CA | 3032575 A1 | 8/2019 |

(56) References Cited

FOREIGN PATENT DOCUMENTS

| | | | |
|---|---|---|---|
| EP | 0014622 | A1 | 8/1980 |
| EP | 0049330 | B1 | 1/1986 |
| EP | 0457679 | B1 | 1/1995 |
| EP | 0953280 | B1 | 11/1999 |
| EP | 0981270 | A1 | 3/2000 |
| EP | 0801523 | B1 | 12/2000 |
| EP | 1219155 | A1 | 7/2002 |
| EP | 1236387 | A1 | 9/2002 |
| EP | 1560157 | A2 | 8/2005 |
| EP | 2213152 | A1 | 8/2010 |
| EP | 2213153 | A1 | 8/2010 |
| EP | 2215903 | B1 | 9/2011 |
| EP | 2747541 | B1 | 4/2016 |
| EP | 3017672 | | 5/2016 |
| EP | 2688385 | B1 | 7/2016 |
| EP | 3056073 | A1 | 8/2016 |
| EP | 2974582 | B1 | 9/2017 |
| EP | 2449871 | B1 | 12/2018 |
| EP | 3409092 | A1 | 12/2018 |
| EP | 3586583 | A1 | 1/2020 |
| EP | 3586584 | | 1/2020 |
| FR | 858062 | A | 11/1940 |
| FR | 1026090 | A | 4/1953 |
| FR | 2210887 | A5 | 7/1974 |
| FR | 2414288 | A1 | 8/1979 |
| FR | 2635432 | A1 | 2/1990 |
| GB | 926217 | A | 5/1963 |
| WO | 2005065441 | A1 | 7/2005 |
| WO | 2013049198 | | 4/2013 |
| WO | 2015031840 | | 3/2015 |
| WO | 2016054715 | A1 | 4/2016 |
| WO | 2017117638 | A1 | 7/2017 |
| WO | 2017192950 | | 11/2017 |
| WO | 2019050944 | A1 | 3/2019 |
| WO | 2019068582 | A1 | 4/2019 |
| WO | 2019091871 | A1 | 5/2019 |
| WO | 2019202194 | A1 | 10/2019 |
| WO | 2019241856 | A1 | 12/2019 |
| WO | 2020014752 | A1 | 1/2020 |

OTHER PUBLICATIONS

European Search Report issued in European Patent Application No. 19174744.3 dated Nov. 28, 2019 (11 pages).
European Search Report issued in European Patent Application No. 19176479.4 dated Nov. 28, 2019 (10 pages).
Alhmadi, M., "Developing a New Powered Seed Delivery System with Constant Seed Release Using Two Confronting Belts," Diss. North Dakota State University, 2018 (76 pages).
Continental Industry, "Bucket Elevator & Seed Belts," <https://www.continental-industry.com/en/Solutions/Conveyor-Belt-Systems/Processing-special-belts/Seeding-Harvesting/Products/Product-Range/Bucket-Elevator-Seed_belts> web page accessed May 21, 2020.

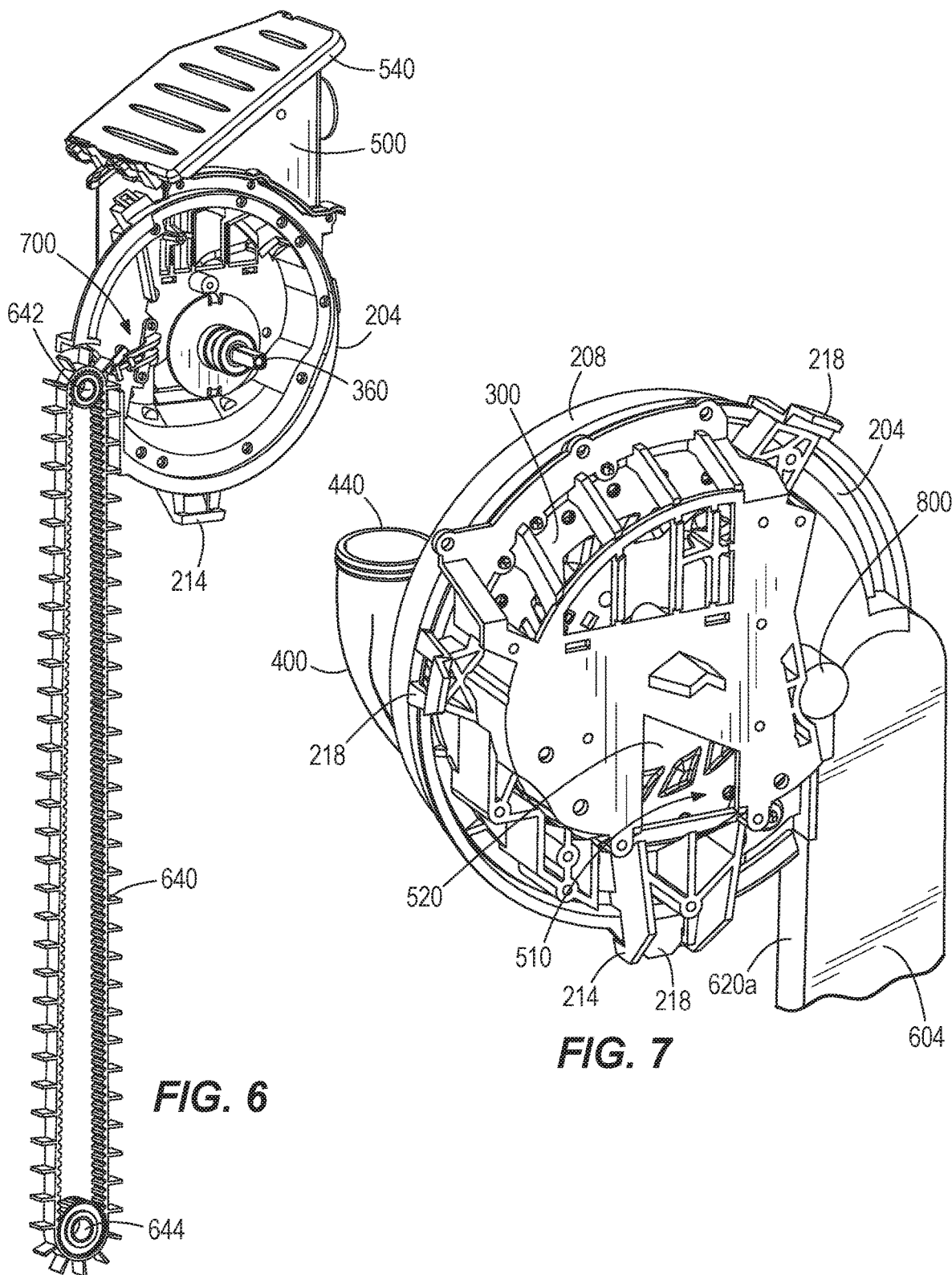

SEEDING SYSTEM

BACKGROUND

The present disclosure relates to a seeding machine having a seed metering system and a seed delivery system for delivering seed from the meter to the ground An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like or powered by electric or hydraulic motors. Each row crop unit has a frame which is movably coupled with a tool bar. The frame may carry a main seed hopper, herbicide hopper and insecticide hopper. If a herbicide and insecticide are used, the metering mechanisms associated with dispensing the granular product into the seed trench are relatively simple. On the other hand, the mechanisms necessary to properly meter the seeds, and dispense the seeds at predetermined relative locations within the seed trench are relatively complicated.

The mechanisms associated with metering and placing the seeds generally can be divided into a seed metering system and a seed placement system which are in series communication with each other. The seed metering system receives the seeds in a bulk manner from the seed hopper carried by the planter frame or by the row unit. Different types of seed metering systems may be used, such as seed plates, finger plates, seed disks, etc. In the case of a seed disk metering system a seed disk is formed with a plurality of seed cells spaced about the periphery of the disk. Seeds are moved into the seed cells with one or more seeds in each seed cell depending upon the size and configuration of the seed cell. A vacuum or positive air pressure differential may be used in conjunction with the seed disk to assist in movement of the seeds into the seed cell. The seeds are singulated and discharged at a predetermined rate to the seed placement or delivery system.

The most common seed delivery system may be categorized as a gravity drop system. In the case of the gravity drop system, a seed tube has an inlet end which is positioned below the seed metering system. The singulated seeds from the seed metering system merely drop into the seed tube and fall via gravitational force from a discharge end thereof into the seed trench. The seed tube may have a rearward curvature to reduce bouncing of the seed as it strikes the bottom of the seed trench and to impart a horizontal velocity to the seed in order to reduce the relative velocity between the seed and the ground. Undesirable variation in resultant in-ground seed spacing can be attributed to differences in how individual seeds exit the metering system and drop through the seed tube. The spacing variation is exacerbated by higher travel speeds through the field which amplifies the dynamic field conditions. Further seed spacing variations are caused by the inherent relative velocity difference between the seeds and the soil as the seeding machine travels through a field. This relative velocity difference causes individual seeds to bounce and tumble in somewhat random patterns as each seed comes to rest in the trench.

SUMMARY

A seeding machine for a row unit includes a seed disk with a plurality of apertures through which an air pressure differential is applicable to retain seed thereon. The seed disk is further rotatable about an axis to convey seed from a seed reservoir. A seed delivery apparatus includes an elongated housing having a first opening through which seed is received, a second opening through which seed exits, and an elongated interior chamber along which seed is conveyed from the first opening to the second opening. The seed delivery apparatus further includes a first pulley, a second pulley, and an endless member driven by the first pulley and/or the second pulley. The endless member is movable within the elongated interior chamber of the elongated housing to receive seed from the first opening and convey seed to the second opening. The endless member is further positioned to sweep across a portion of the seed disk. The seed disk is controllable to angularly accelerate cooperatively with movement of the endless member to facilitate movement of a retained seed by the endless member from the seed disk.

Other features and aspects of the disclosure will become apparent by consideration of the following detailed description and accompanying drawings.

BRIEF DESCRIPTION OF THE DRAWINGS

FIG. 6 is another rear perspective view of the seeding machine of FIG. 3 with certain cover portions removed.

FIG. 7 is a perspective view of a front or seed side of the seeding machine of FIG. 3.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
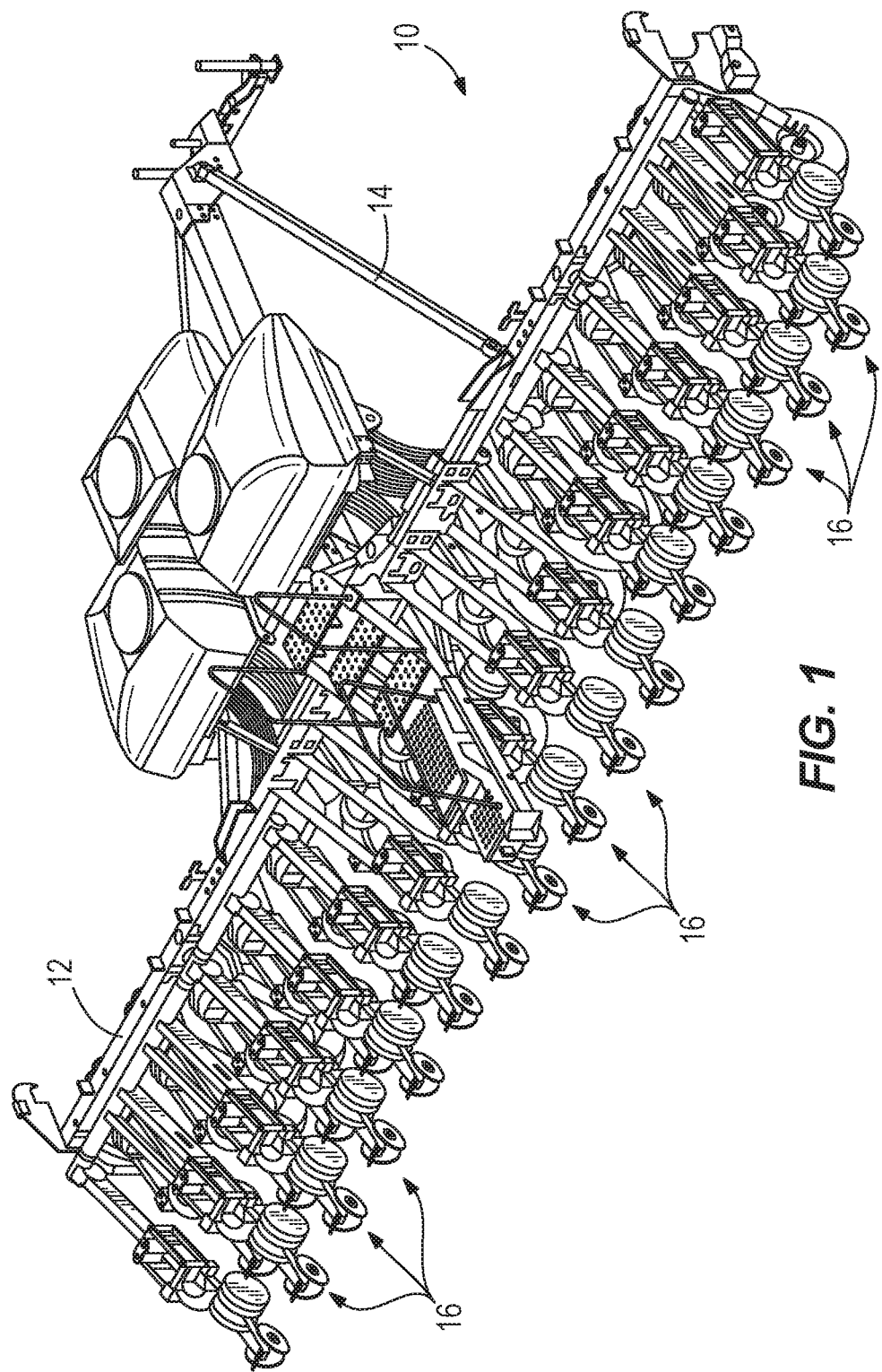
FIG. 1 is a plan view of a planter having a plurality of row units.

With reference to FIG. 1 an example planter or seeding machine 10 is shown containing a seed delivery system. Planter 10 includes a tool bar 12 as part of a planter frame 14. Mounted to the tool bar 12 are multiple planting row units 16. Row units 16 are typically identical for a given planter but there may be differences.

Figure 2:
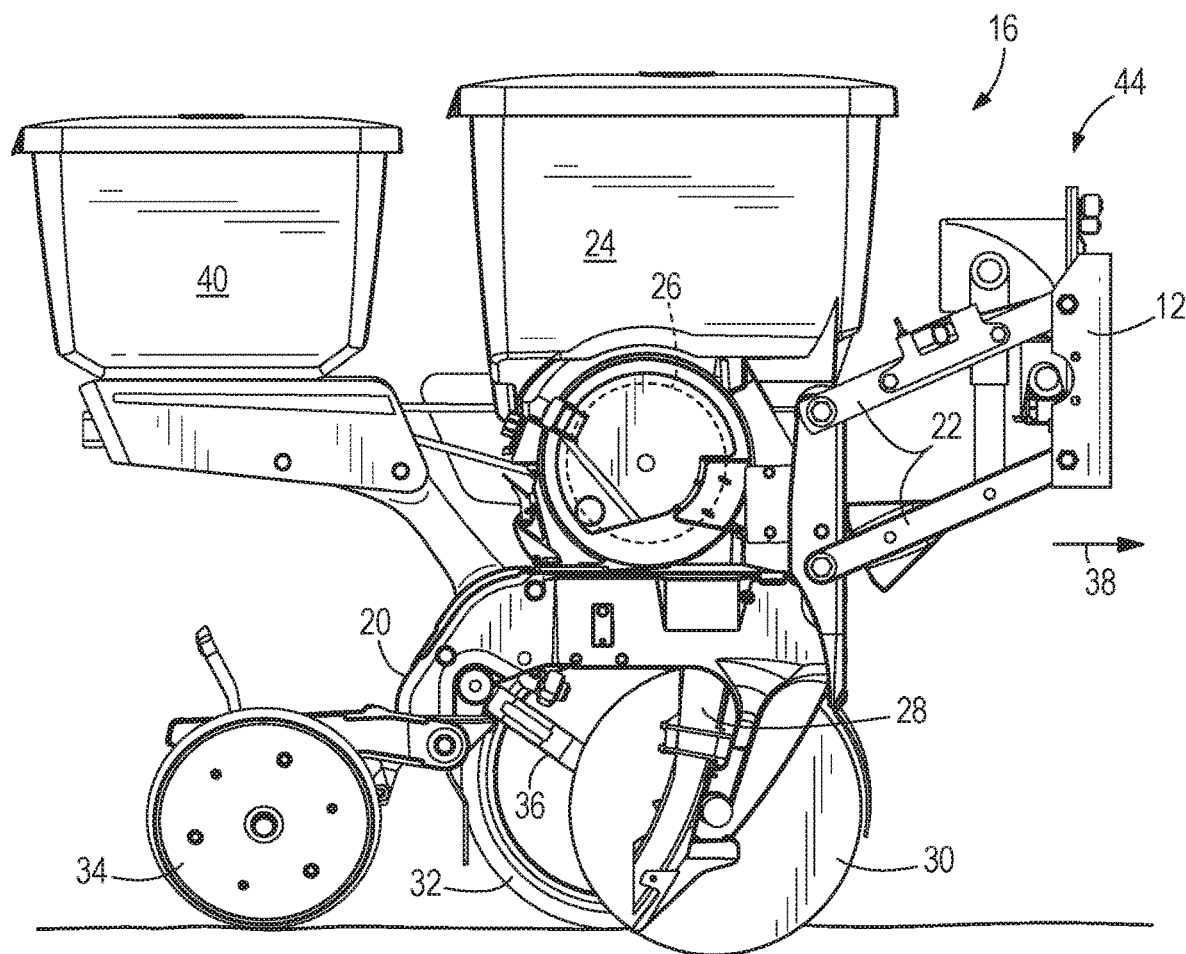
FIG. 2 is a side view of a row unit of the planter of FIG. 1.
Figure 3:
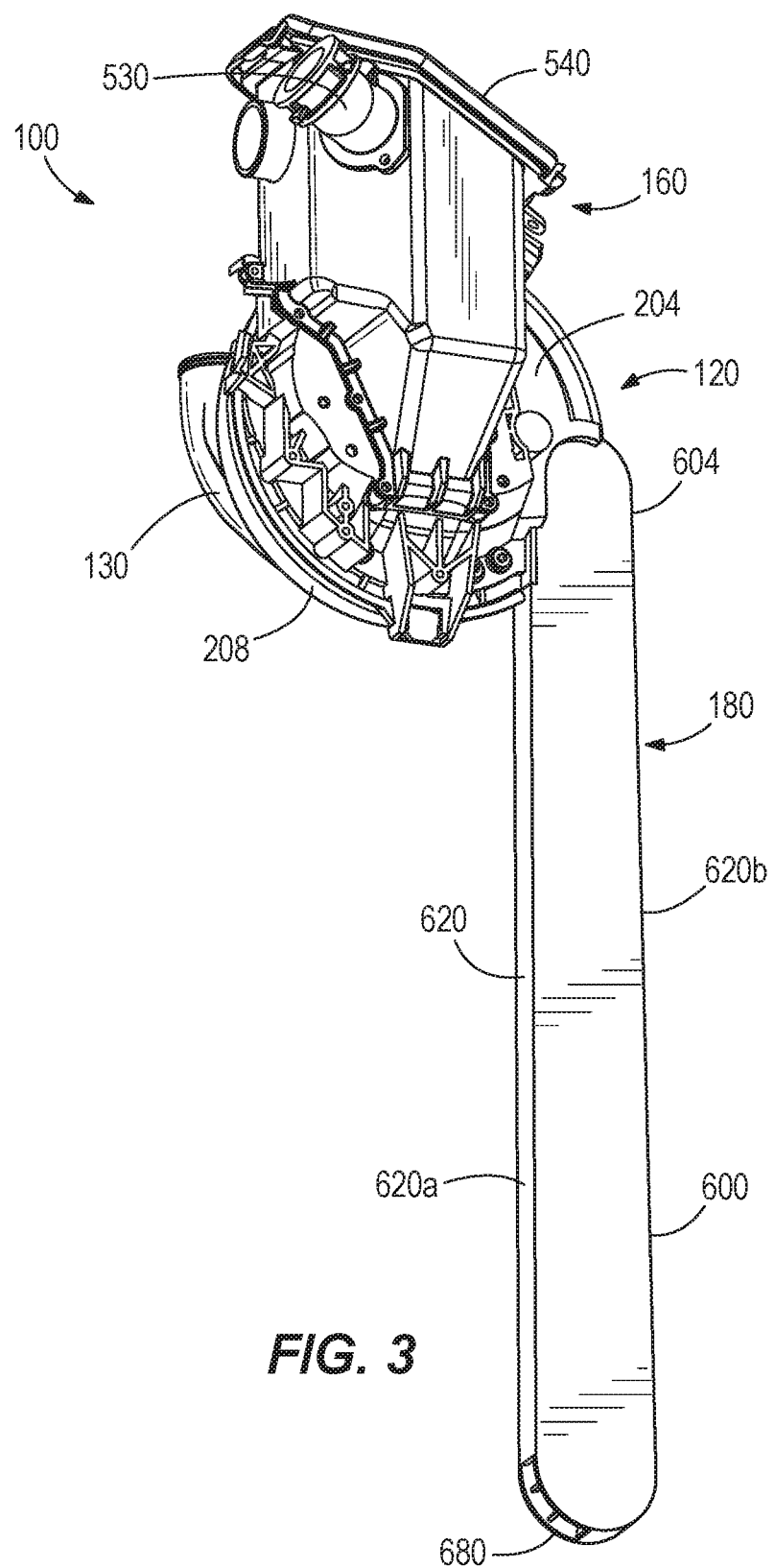
FIG. 3 is a front perspective view of a seeding machine for the row unit of FIG. 2.
Figure 4:
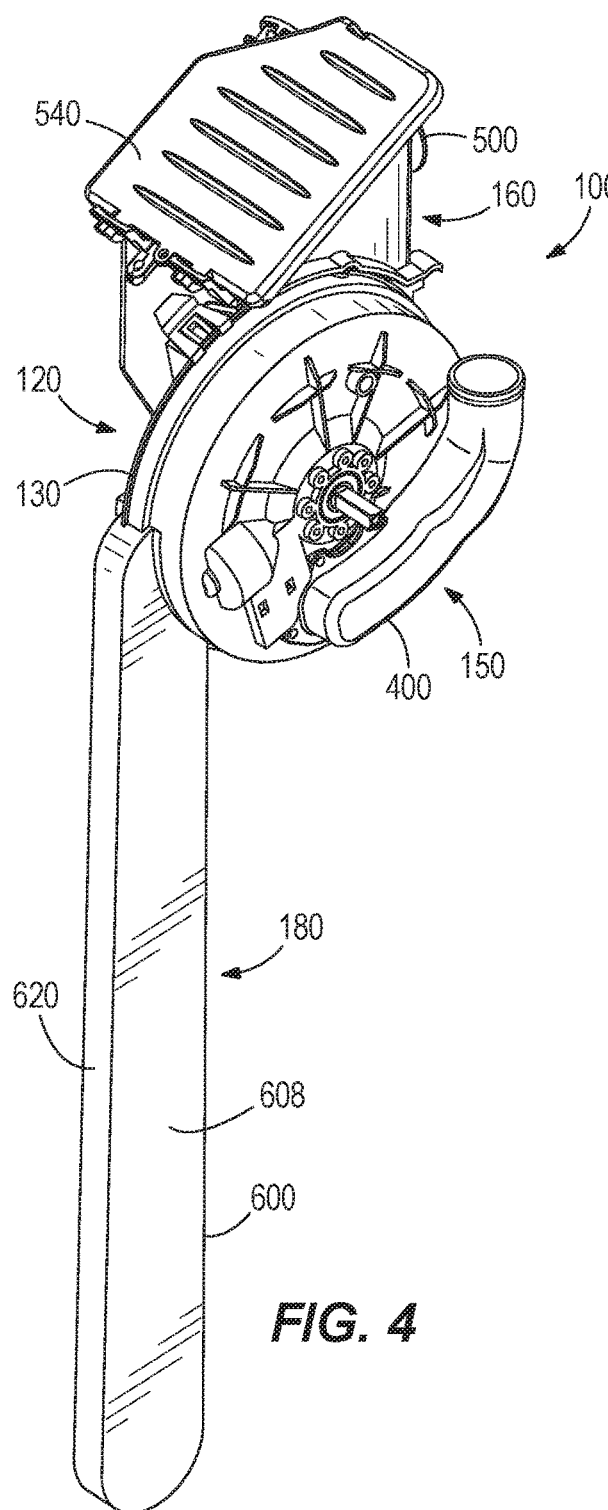
FIG. 4 is a rear perspective view of the seeding machine of FIG. 3.
Figure 5:
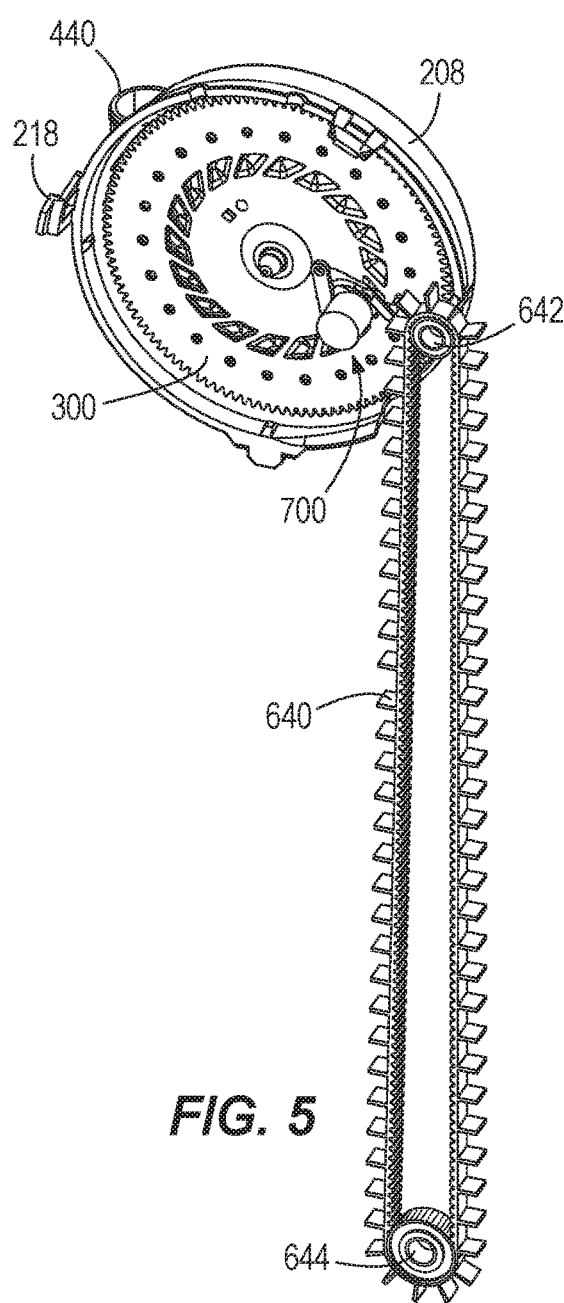
FIG. 5 is another front perspective view of the seeding machine of FIG. 3 with certain cover portions removed.

A row unit 16 is shown in greater detail in FIG. 2. The row unit 16 is provided with a central frame member 20 having a pair of upwardly extending arms (not shown) at the forward end thereof that connect to a parallelogram linkage 22 for mounting the row unit 16 to the tool bar 12 for up and down relative movement between the unit 16 and toolbar 12 in a known manner. Seed is stored in seed hopper 24 and provided to a seed meter 26. Seed meter 26 is of the type that uses a vacuum to generate a pressure differential. Other types of seed meters can be used as well. From the seed meter 26 the seed is carried by a delivery system 28 into a planting furrow, or trench, formed in the soil by furrow openers 30. Gauge wheels 32 control the depth of the furrow. Closing wheels 34 close the furrow over the seed. The gauge wheels 32 are mounted to the frame member 20 by arms 36.

The tool bar 12 and row unit 16 are designed to be moved over the ground in a forward working direction identified by the arrow 38.

The row unit 16 further includes a chemical hopper 40 a row cleaner attachment (not shown), and a down force generator 44. The row unit 16 is shown as an example of the environment in which the delivery system 28 is used. The delivery system 28 can be used in any of a variety of planting machine types such as, but not limited to, row crop planters, grain drills, air seeders, etc.

Referring to FIGS. 3-9, another type of seed meter and delivery system (collectively a seeding machine) is illustrated for use with the row unit 16. The seeding machine 100 includes a seed meter 120 having seed meter housing 130 containing a seed disk therein, an air or vacuum system 150, a mini-hopper 160, and a seed delivery apparatus 180.

The seed meter housing 130 comprises first (front) and second (rear) halves or portions 204, 208 releasably joinable or couplable using a plurality of housing coupling pairs. The respective fittings 214, 218 of the coupling pairs may be snap fittings or other suitable fittings spaced about the periphery of each respective half 204, 208 for alignment and engagement of the two halves. Each fitting 214, 218 may be differently configured depending on position about the respective half 204, 208.

The seed disk 300 in the illustrated embodiment is in the form of a generally flat disk. The disk 300 has a front side or face 304 and a rear side or face 308. The front side 304 may further be defined as a seed side and the rear side 308 may be defined as a vacuum side. A row of circumferentially spaced apertures 320 at a fixed radius from the disk axis 324 is arranged around a circular path radially inward of the edge or periphery 330 of the disk 300. Each aperture 320 extends through the disk 300 between the rear side 308 and the front side 304. In some embodiments, the disk apertures 320 have on the front face 304 a flat or planar surrounding disk surface. Alternatively, the apertures 320 are surrounded by seed cells. The front face 304 may optionally include a plurality of seed agitators 340 at a radial position relative to the apertures 320.

Figure 12:
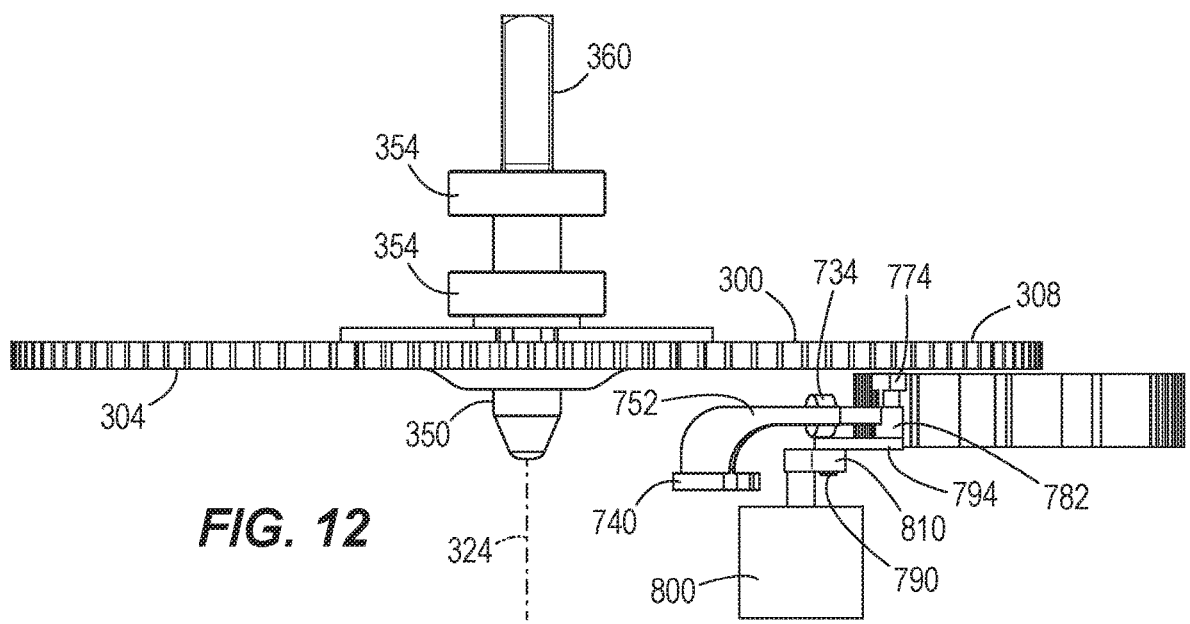
FIG. 12 is a top view of select components of the seeding machine of FIG. 3.

Referring also to FIG. 12, the disk 300 is rotatably mounted to a hub 350 with suitable bearings 354 fixed to a splined or shaped drive axle 360 connected to the shaft of a motor or other motive device, such as a servo motor or stepper motor (not shown). In some applications, other known methods of rotating the hub 350 other than a direct axial drive may be employed, to include an indirect gear mechanism (for example, via teeth 370 at the outer edge 330 of the disk), transmission and drive cable, pulley, belt or other such device. A seal or sealing ring 220 between the housing 130 and the disk 300 hinders the escape of seeds therebetween.

Figure 8:
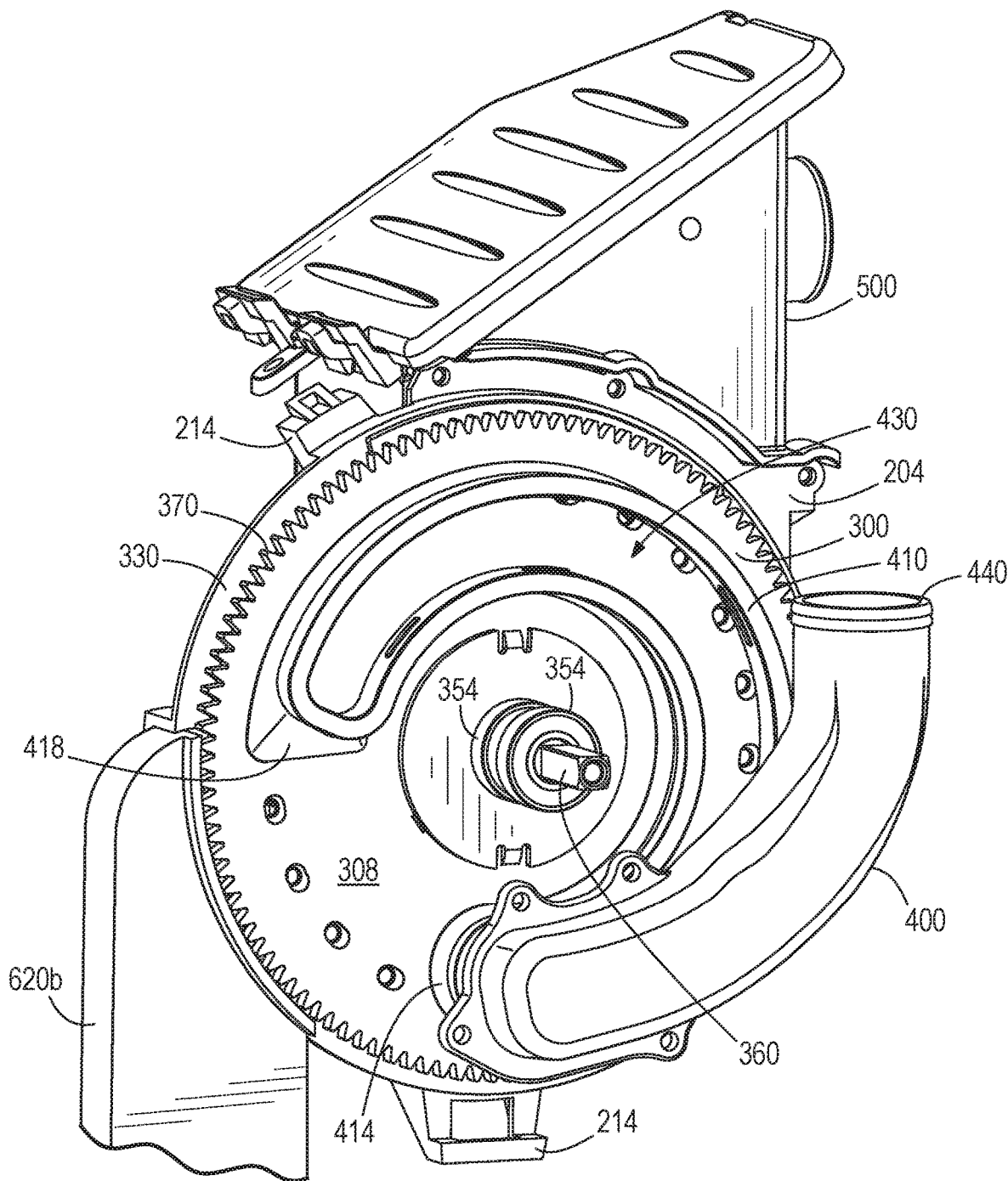
FIG. 8 is a perspective view of a rear side of the seeding machine of FIG. 3 with a cover portion removed.

Referring in particular to FIG. 8, the vacuum system 150 includes a vacuum tube 400 coupled to the rear housing 208 and in communication with a portion of the contained volume adjacent the rear side 308 of the disk 300. Specifically, a curvilinear vacuum seal 410 with a first end 414 and a second end 418 forms a sealable interface with the rear disk face 308 and surrounds a circumferential section 430 of the rear face 308 at a radial position bounding a portion of the path of the apertures 320. The vacuum tube 400 communicates through the tube connector 440 with an air pump or vacuum pump (not shown) for generating a vacuum within the tube 400. In other embodiments, a pressure differential may instead be generated by known methods of generating a positive pressure on the front side of the disk.

Figure 10:
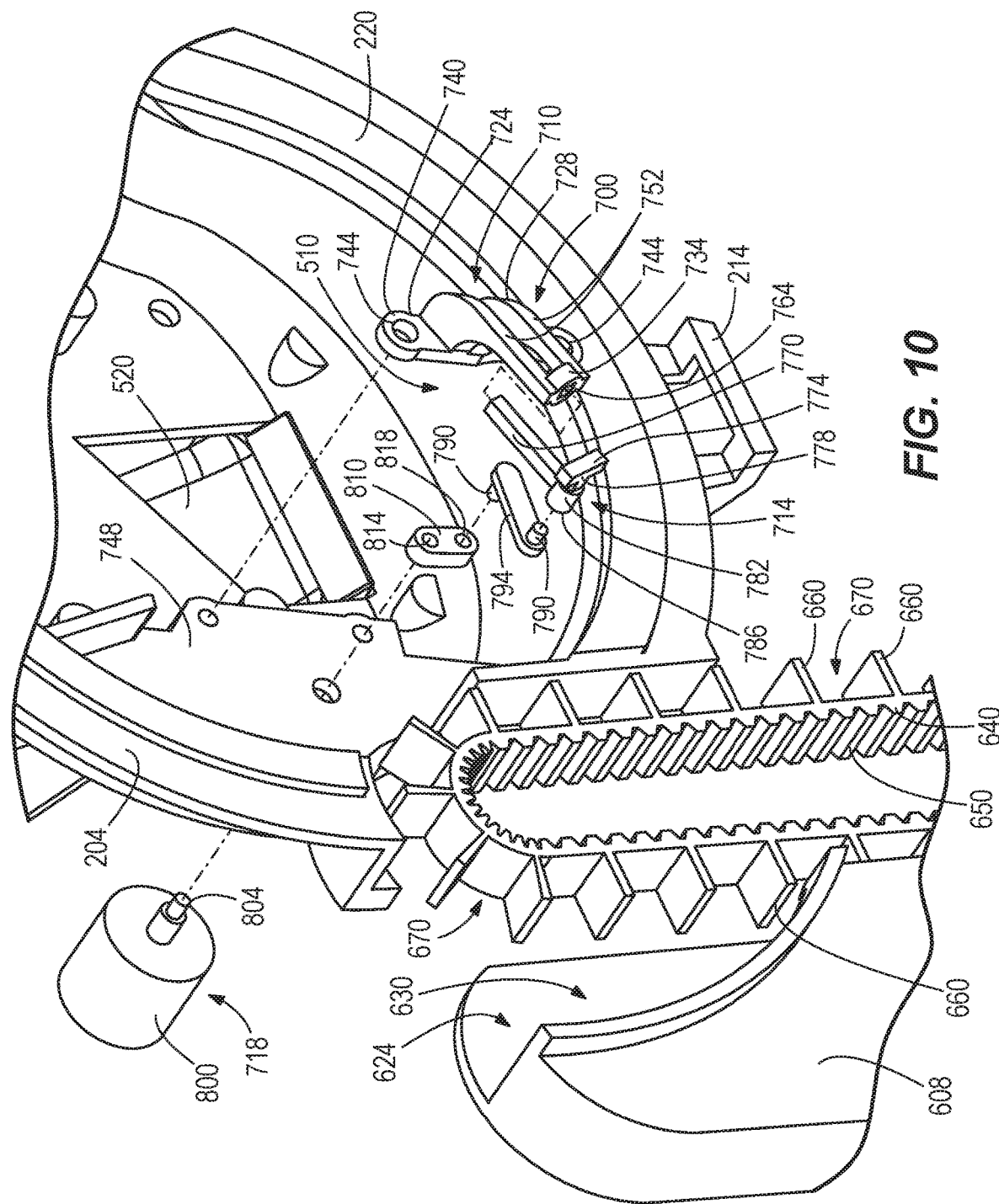
FIG. 10 is an exploded perspective view of select components of the seeding machine of FIG. 3.
Figure 11:
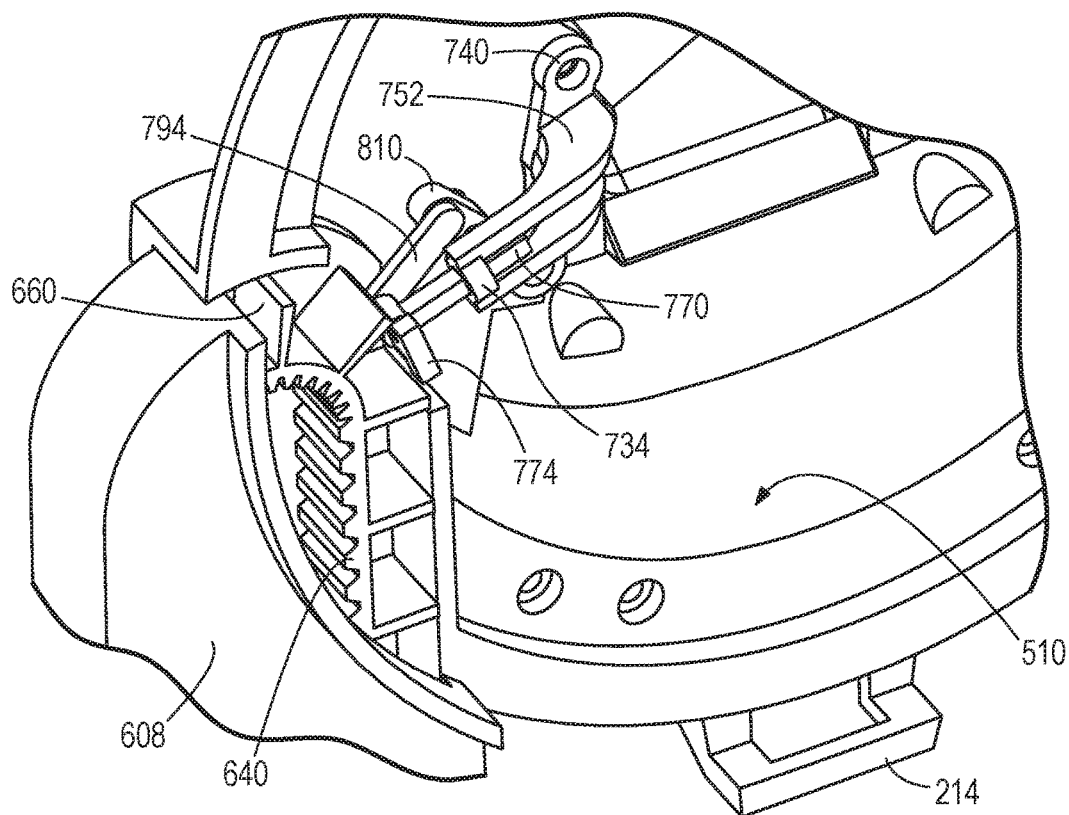
FIG. 11 is an unexploded perspective view of select components illustrated in FIG. 10.

The mini-hopper 160 includes a housing 500 defining a volume in communication with the front side 304 of the disk 300, in particular with a lower region or seed reservoir 510 via a mini-hopper opening 520 in the front half 204 of the seed meter housing (FIGS. 7 and 10-11). The housing 500 includes a seed supply inlet 530 and a cover 540 for interior access.

The seed delivery apparatus 180 includes an elongated housing 600 with spaced apart front and rear walls 604, 608 and a side wall 620 therebetween defining an interior chamber 624. An inlet opening 630 in the side wall 620 communicates the interior chamber 624 with the seed meter interior through an associated opening in the seed meter housing 130. A pair of pulleys mounted inside the housing 600 supports an endless member or belt 640 for rotation within the housing 600. One of the pulleys is a drive pulley 642 and the other is an idler pulley 644. The drive pulley 642 is connected to the shaft of a motor or other motive device, such as a servo motor or stepper motor (not shown). A base member 650 of the belt 640 engages the pulleys and flights 660 extend from the base member 650 to form seed receptacles 670. In other embodiments, the belt 640 may instead have elongated bristles (not shown) extending from the base 650 to a position at or near the inner surface of the housing side wall 620, e.g., a brush belt, or alternatively may present a resilient surface for receiving seed. An exit opening 680 is formed in the sidewall 620 opposite the inlet opening 630. The side wall 620 is thus divided by the inlet and exit openings 630, 680 into two segments 620a, 620b.

The seed disk 300 and the front and rear walls 604, 608 of the housing 600 lie in generally parallel planes, which themselves are generally parallel to the direction of travel of the row unit 16.

Figure 9:
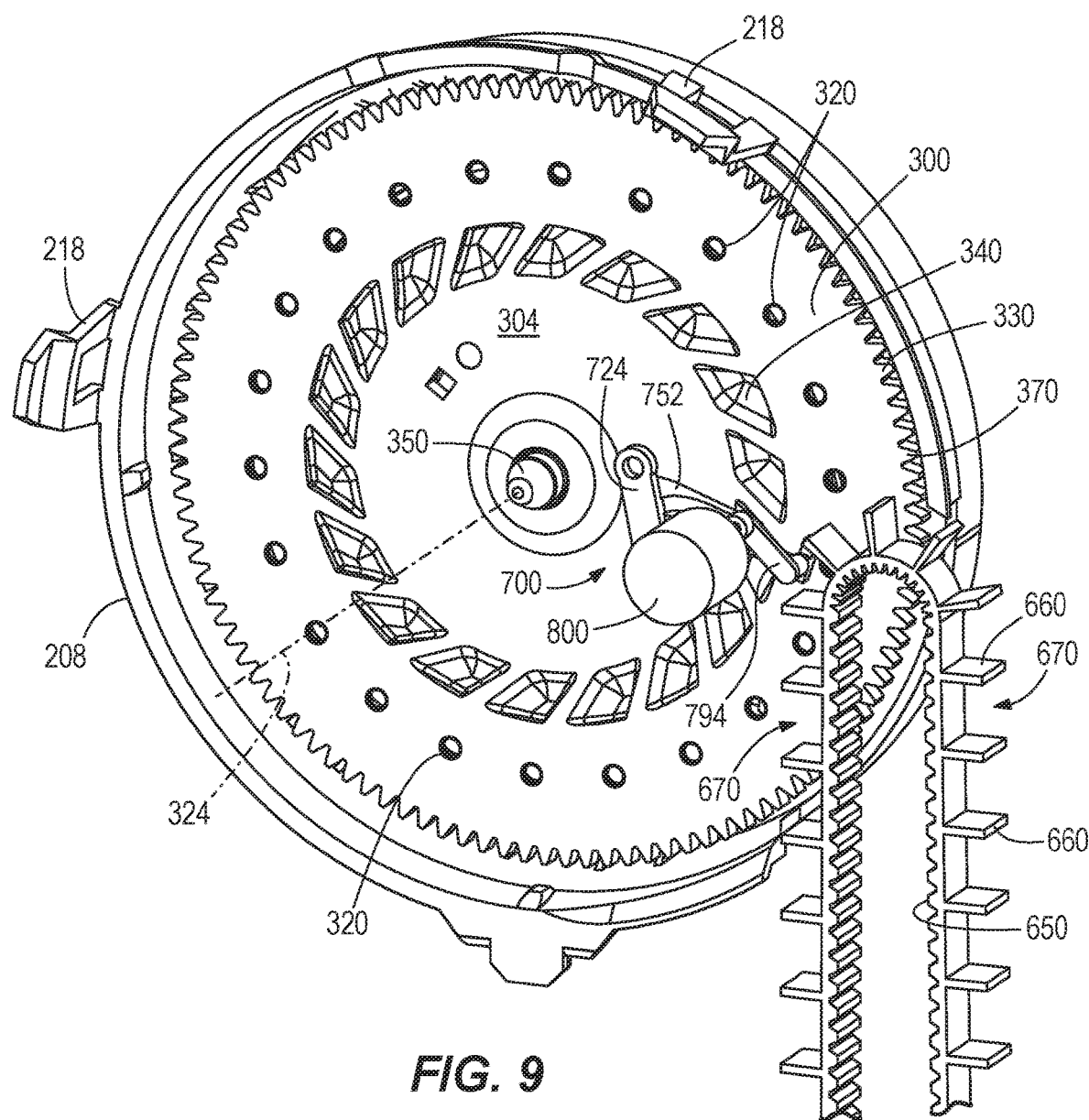
FIG. 9 is a perspective view of the seed side of the seeding machine of FIG. 3 with a cover portion removed.

Referring to FIGS. 9-11, a seed diverter 700 is positioned within the volume contained by the seed meter housing 130. Specifically, the seed diverter 700 includes a bracket 710, a slider crank mechanism 714, and an actuator 718.

The bracket 710 includes a bracket mount 724, a bracket frame 728, and a slider receiver 734. The bracket mount 724 includes a mounting plate 740 with apertures 744 for mounting to an inside surface 748 of the front housing half 204. The bracket frame 728 extends from the mounting plate 740 and forms two arms 752 with a recess therebetween. The slider receiver 734 is positioned at or adjacent the end of the arms 752 and defines a receiver opening 764.

The slider crank mechanism 714 comprises a slider arm 770, at one end of which is a slider head 774 presenting a generally flat contact surface 778. Lateral to the slider head 774 as illustrated is a linkage receiver 782 having an aperture 786 configured to receive one of two protrusions 790 of a crank arm 794.

The actuator 718 includes a motor 800, such as a stepper motor, or in some applications a servo motor, having a shaft 804. An offset linkage 810 includes a first hole 814 to receive the motor shaft 804 and a second hole 818 to receive the second of the two protrusions 790.

To facilitate this synchronization between the apertures 320, the flights 660, and the motor 800, one or more sensors may be located within the housing 130 to detect the rate of travel and/or presence of one or more flights 660. In other embodiments, one or more sensors may be located within the housing 130 to detect the rate of travel and/or presence of one or more apertures 320. Alternatively, if a fixed relationship among the stepper or servo motor of the drive pulley 642, the drive pulley 642, and the belt 640 is known, then control logic can be employed between the stepper or servo motor of the drive pulley 642, the stepper or servo motor of the disk 300, and the motor 800 to control the rotation or position of the motor 800 (i.e., the motor 800 is capable of position calibration with the motor of the drive pulley 642 and/or the motor of the disk 300). Motor position data can be communicated to a controller for motor alignment among all three motors.

In assembly of the seed diverter 700, the bracket 710 is mounted to the interior surface 748 using standard fasteners, which locates the bracket frame 728 relative to the disk 300 and to the opening 630. The slider arm 770 is received in the receiver opening 764 such that it is translatable along and between the two arms 752 and constrained to linear movement by the slider receiver 734. Movement of the slider arm 770 is therefore generally outward/inward relative to the disk axis 324 as it translates across a portion of the disk 300, but it need not be directly radial relative to the disk axis 324. The crank arm 794 is positioned such that one protrusion 790 is received within the aperture 786 and the other protrusion 790 is inserted into the second hole 818 of the offset linkage 810. The motor shaft 804 engages the first hole 814 of the linkage 810 and the motor 800 is secured to the front half 204 of the seed meter housing 130.

In operation, as the row unit 16 proceeds in the direction identified by arrow 38 in a seeding application, the seed disk 300 rotates about the axis 324 of the seed disk by a seed disk motor or other direct or indirect motive device (not shown). With respect to FIG. 9, the disk 300 rotates clockwise. Seed accumulates in the seed reservoir area 510 from the mini-hopper 160, which itself is supplied with seed from an upstream distribution system. An air or vacuum pump is actuated and a pressure differential developed across a portion of the disk 300. In particular, an area of lower than atmospheric pressure is generated within the boundaries of the vacuum seal 410 on the rear side 308, which results in a pressure difference between the front and rear sides 304, 308. As one or more apertures 320 pass through the seed reservoir area 510 and the area of low pressure, i.e., the section 430, with rotation of the disk 300, a force due to the pressure differential between the sides 304, 308 retains seed on the front face 304 at each aperture location corresponding to the boundaries of the seal 410. A doubles eliminator (not shown) located within the housing 130 removes excess seeds from each aperture 320 such that one seed per aperture travels with the associated aperture 320 as the disk 300 rotates. Additional components within the seed meter housing 130 need not be operationally described.

Concurrently, the drive pulley 642 of the seed delivery apparatus 180 rotates to drive the endless member 640 within the interior chamber 624 at a speed cooperative with the forward movement of the seeding machine 10 and the rotational rate of the disk 300. With respect to FIG. 9, the endless member 640 rotates counterclockwise. The flights 660 are designed such that the receptacles 670 pass across the opening 630.

As the adhered seed approaches the second end 418 of the vacuum seal 410, the seed diverter 700 is configured to contact and guide the seed to affect that seed's trajectory into the seed delivery apparatus 180.

Specifically, the actuator 718 rotates the slider crank mechanism 714 at a rate synchronous with a rotation rate of the disk 300 and in coordination with a rotation rate of the first pulley. In particular, the motor 800 rotates at a predetermined rate that accounts for the angular velocity of the disk 300, the radial distance of the row of apertures 320, and the circumferential spacing between apertures 320 such that the contact surface 778 contacts a seed at or very nearly in concert with the termination of the pressure differential as the subject aperture 320 passes over the second end 418 of the vacuum seal 410, which frees the seed from the aperture 320. In some applications, contact occurs after full removal of the pressure differential. Alternatively, the controller receives sensor information from the flight 660 or aperture 320 position sensor(s) and/or motor position data and coordinates motion of the actuator 718 accordingly.

Figure 13:
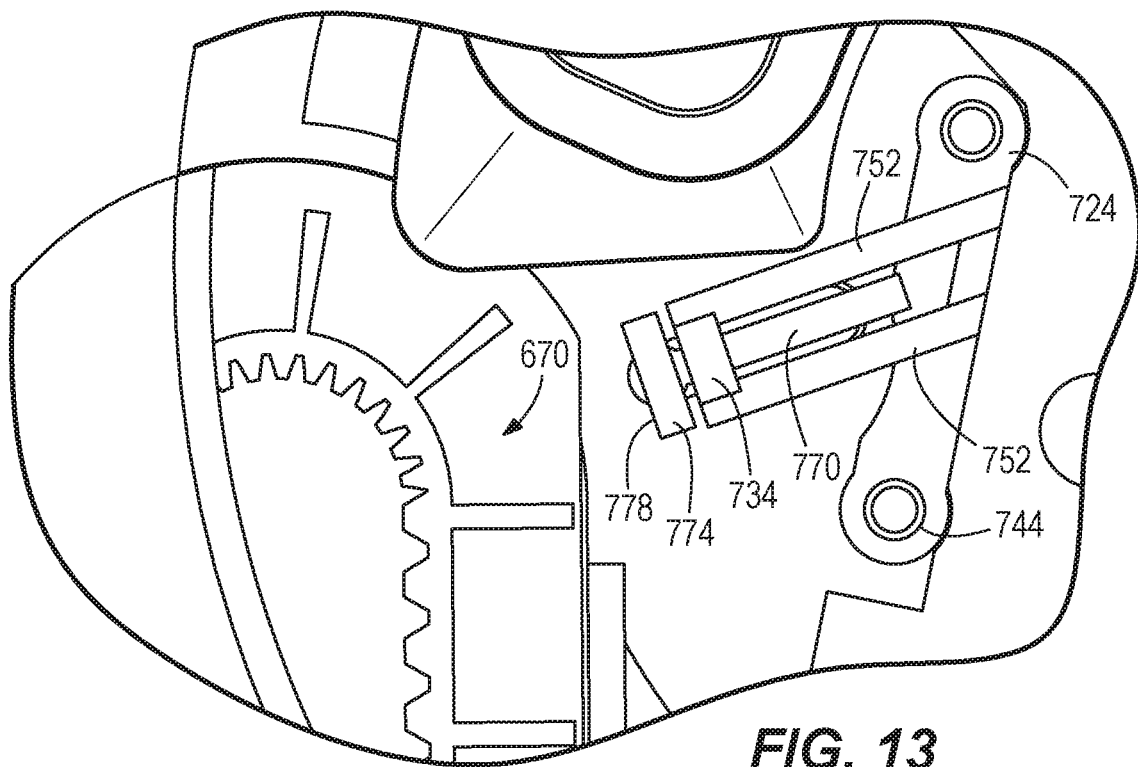
FIG. 13 is a side view of a seed diverter in a retracted position.
Figure 14:
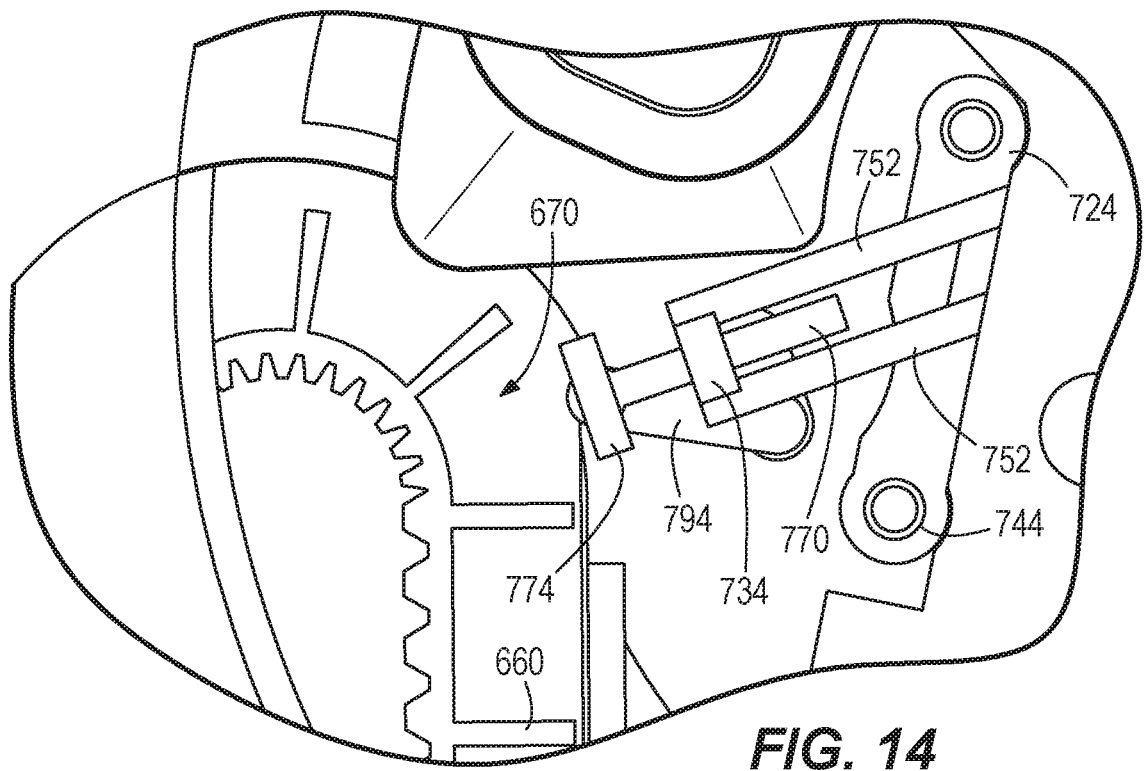
FIG. 14 is a side view of the seed diverter of FIG. 10 between a retracted and extended position.
Figure 15:
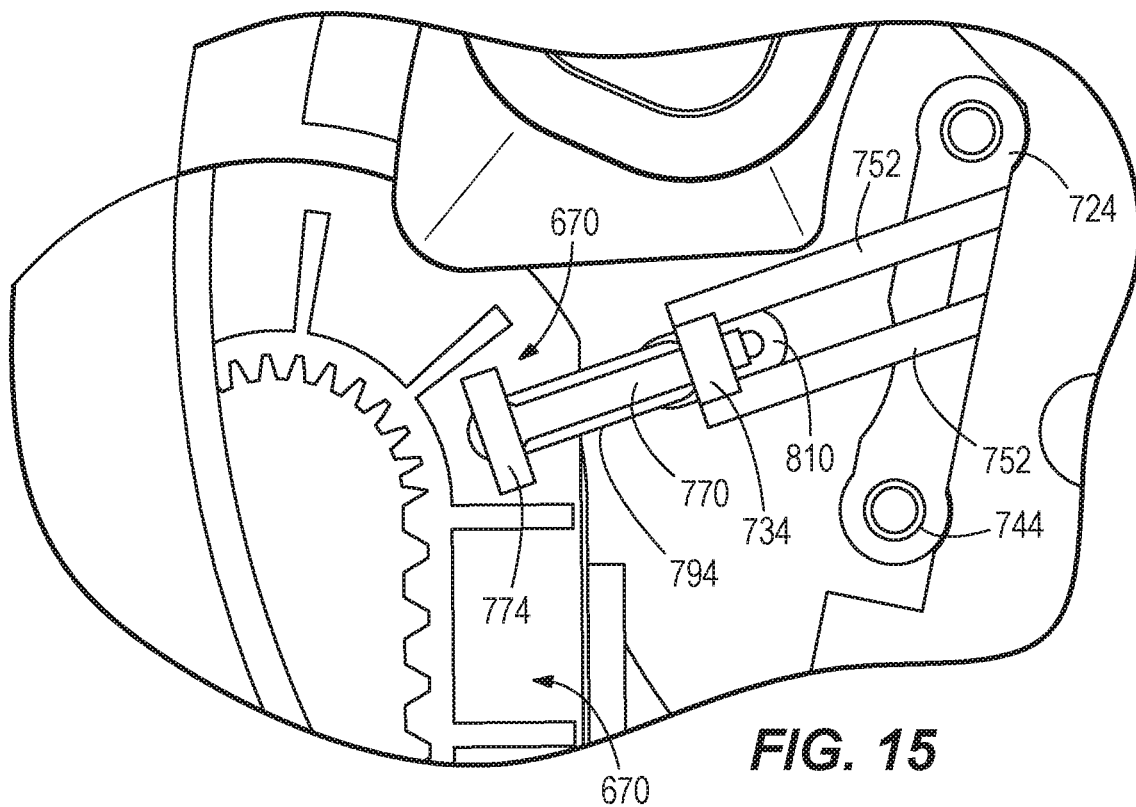
FIG. 15 is a side view of the seed diverter of FIG. 10 in an extended position.
Figure 16:
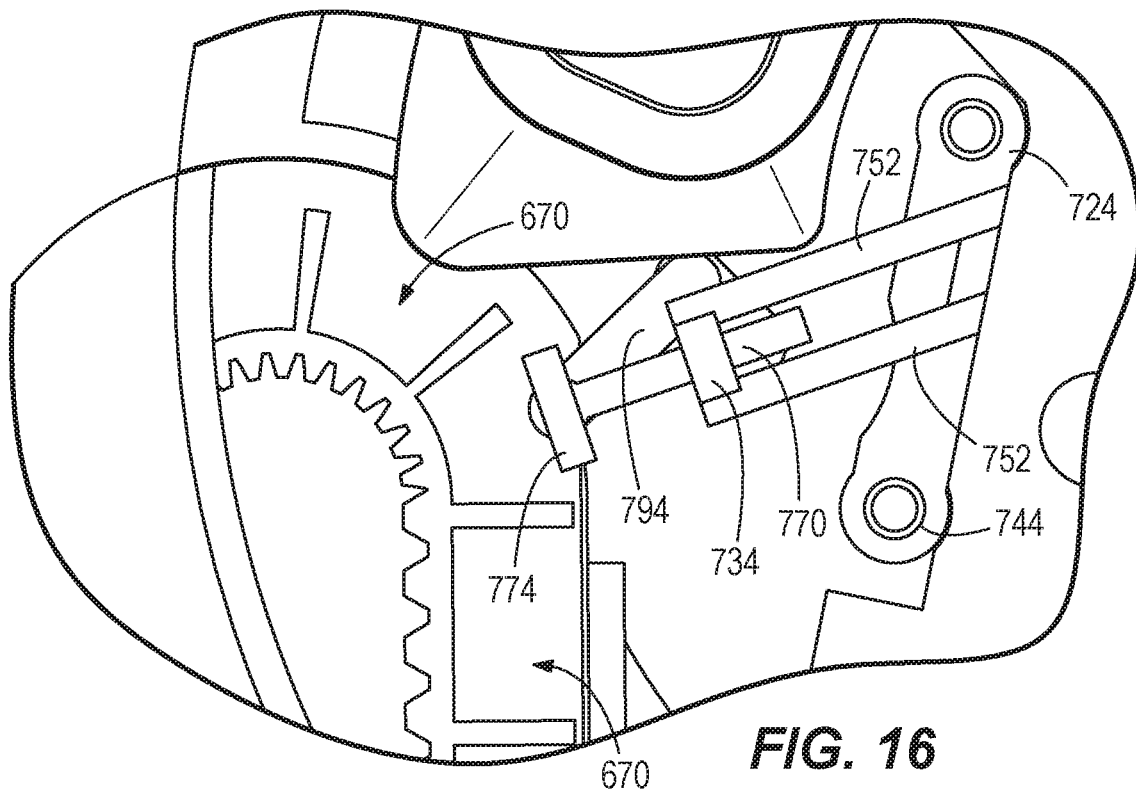
FIG. 16 is a side view of the seed diverter of FIG. 10 between an extended and retracted position.

Referring to FIG. 13, in one position the slider arm 770 (and slider head 774) are in a first or retracted position. As the offset linkage 810 rotates (clockwise with respect to FIG. 10), the action between the linkage 810 and the crank arm 794 drives the slider arm 770 away from the arms 752, away from the axis 324, and toward the disk edge 330 as illustrated in FIG. 14. With continued rotation and reference to FIG. 15, the slider head 774 reaches a second or extended position at which the contact surface 778 contacts the seed to guide the seed through the opening 630 and into a seed receptacle 670. In some embodiments, the slider head 774 extends wholly into the seed receptacle 670, in other embodiments the slider head 774 extends partially into the seed receptacle 670, and in yet other embodiments the slider head 774 at full extension does not extend into the seed receptacle 670. Additionally, in some embodiments, contact with the seed occurs before full extension of the slider arm 770 as the contact surface 778 passes through the radial position of the subject aperture 320. As illustrated in FIG. 16, once past full extension, further rotation of the offset linkage 810 drives the slider arm 770 back to the retracted position, at which point the extension/retraction cycle begins anew.

The seed received within the seed receptacle 670 thereafter moves with the endless member 640 toward the opening 680 at which point it exits the housing 600 via the opening 680 into the formed trench.

FIGS. 17-25 illustrate additional seed diverter embodiments. The features of the row unit 16 as previously described are applicable to the description of the additional seed diverters of FIGS. 17-25, such that not all details need to be described with respect to each embodiment. Each seed diverter hereafter disclosed is mounted with a bracket or similar securing feature (not shown) to an inside surface 748 of the front housing half 204, in an orientation similar to that shown in FIG. 9. Further, some of the following embodiments may make use of the aforementioned sensors located within the housing 130 to detect the travel and/or presence of the flights 660 and/or the apertures 320 as previously described for synchronization between the apertures 320, the flights 660, and an actuator.

Figure 17:
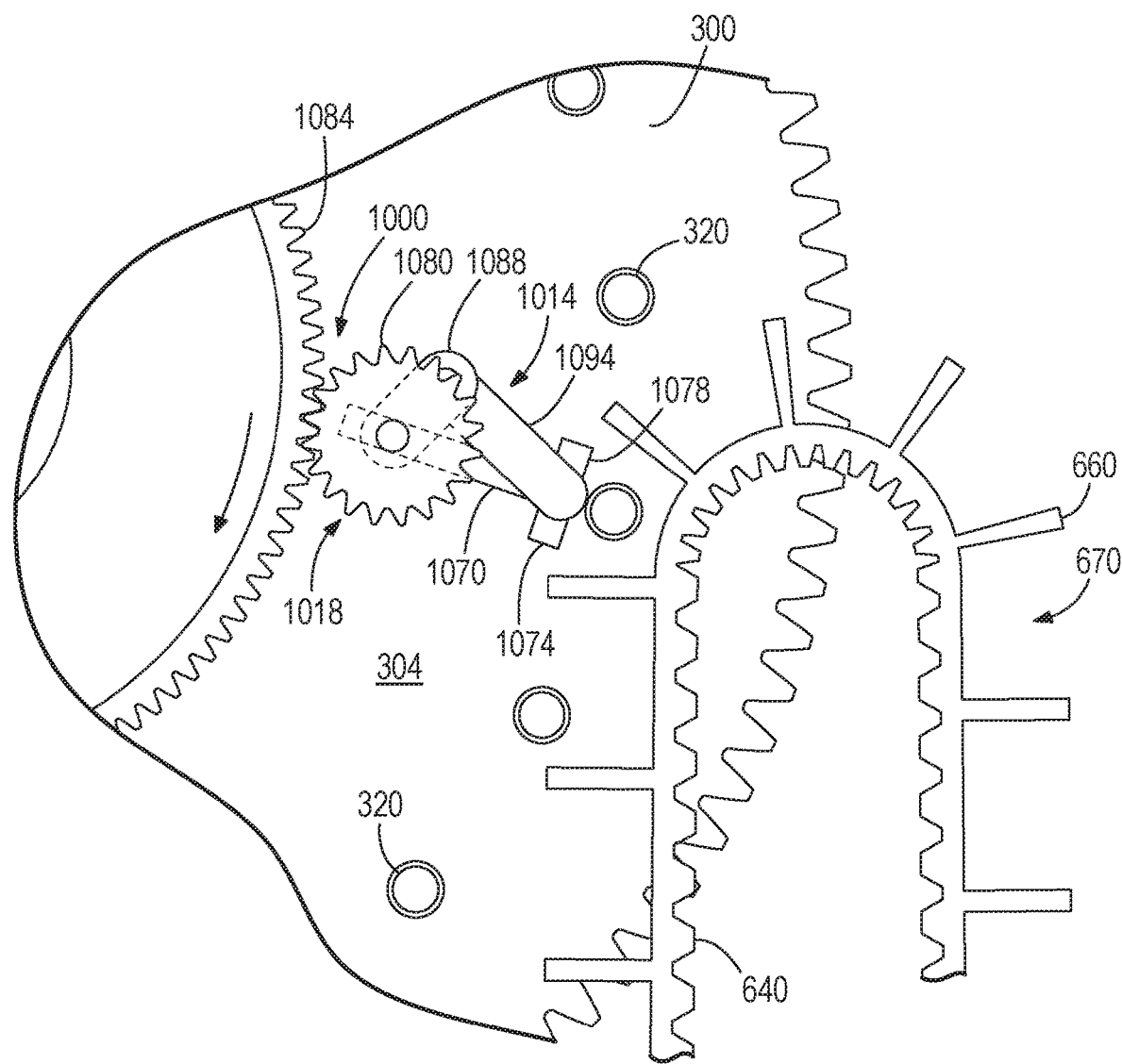
FIG. 17 is a side view of another seed diverter.

Referring to FIG. 17, a seed diverter 1000 is similar to the seed diverter 700 with a differently configured drive mechanism. The seed diverter 1000 is positioned within the volume contained by the seed meter housing 130 and includes a slider crank mechanism 1014 and an actuator 1018.

The slider crank mechanism 1014 comprises a slider arm 1070, at one end of which is a slider head 1074 presenting a generally flat contact surface 1078. A crank arm 1094 is affixed to either the slider arm 1070 or the slider head 1074.

The actuator 1018 is in the form of a pinion 1080 engageable with a set of teeth 1084 integrally formed as part of or separately affixed to the seed disk 300. An offset linkage 1088 is rotatable with the axis of the pinion 1080 and attaches to an end of the crank arm 1094.

In operation, as the row unit 16 proceeds in the direction identified by arrow 38 in a seeding application, the seed disk 300 rotates about the axis 324 of the seed disk by a seed disk motor or other direct or indirect motive device (not shown). With respect to FIG. 17, the disk 300 rotates clockwise. Seed accumulates in the seed reservoir area 510 and a pressure differential is developed across a portion of the disk 300 as previously described for retaining seed on the front face 304. Concurrently, the endless member 640 is driven counterclockwise with respect to FIG. 17, also as previously described.

As the adhered seed approaches the second end 418 of the vacuum seal 410, the seed diverter 1000 is configured to contact and guide the seed to affect that seed's trajectory into the seed delivery apparatus 180.

Specifically, the pinion 1080 engages the teeth 1084 to rotate in a counterclockwise direction, concurrently rotating the offset linkage 1088 about the axis of the pinion 1080. As with the seed diverter 700, the attached crank arm 1094 translates the slider arm 1070 in a reciprocating fashion (in this embodiment at a rate synchronous with a rotation rate of the disk 300) such that the contact surface 1078 contacts a seed at or very nearly in concert with the termination of the pressure differential as the subject aperture 320 passes over the second end 418 of the vacuum seal 410.

Referring again to FIG. 17, the slider head 1074 during extension reaches a second or extended position at which the contact surface 1078 contacts the seed to guide the seed into a seed receptacle 670. In some embodiments, the slider head 1074 extends wholly into the seed receptacle 670, in other embodiments the slider head 1074 extends partially into the seed receptacle 670, and in yet other embodiments the slider head 1074 at full extension does not extend into the seed receptacle 670. Additionally, in some embodiments, contact with the seed occurs before full extension of the slider arm 1070 as the contact surface 1078 passes through the radial position of the subject aperture 320. Once past full extension, the actuator 1018 drives the slider arm 1070 back to a first or retracted position, at which point the extension/retraction cycle begins anew.

Figure 18:
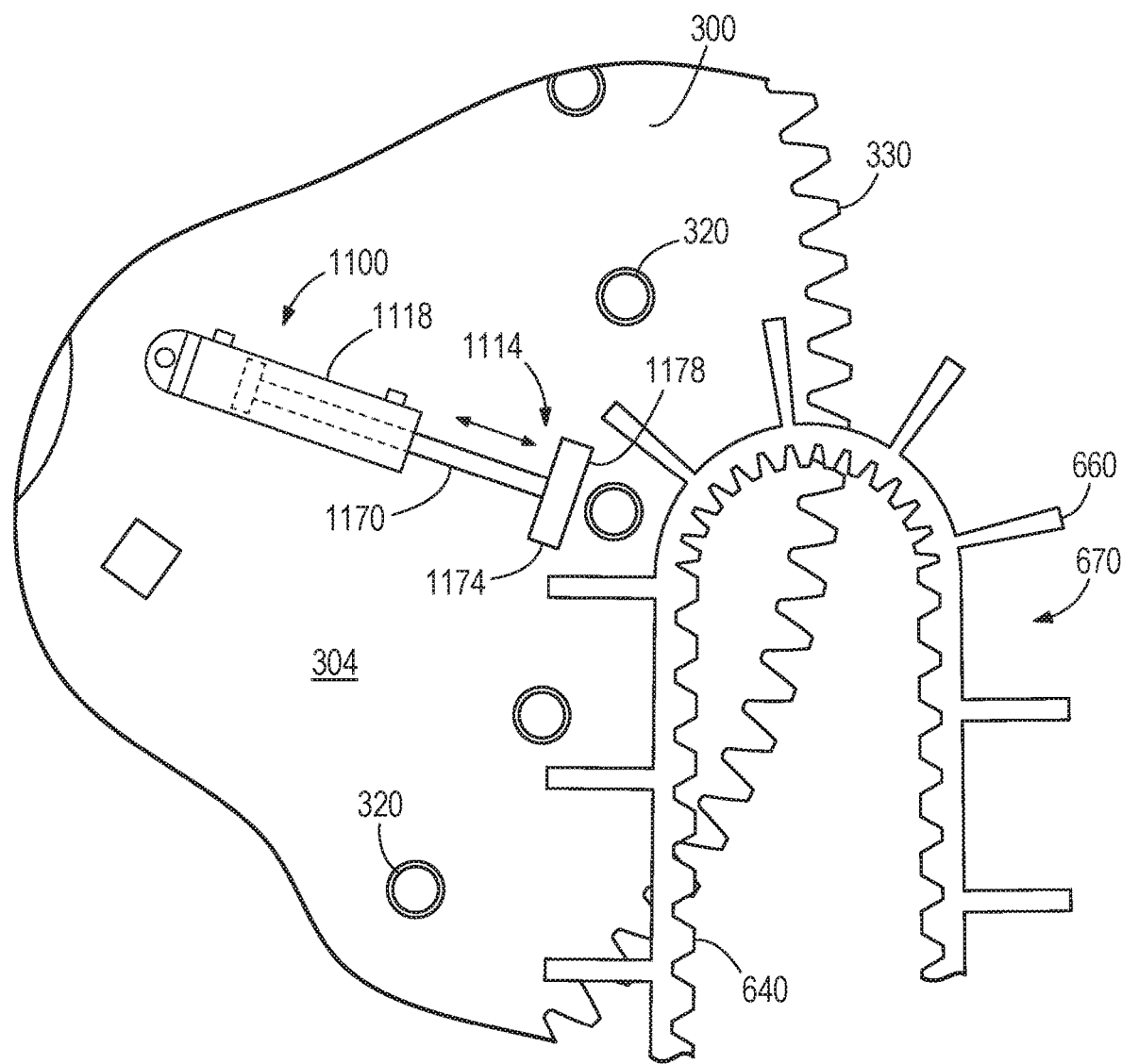
FIG. 18 is a side view of another seed diverter.

Referring to FIG. 18, another seed diverter 1100 includes a slider mechanism 1114 and an actuator 1118.

The slider mechanism 1114 comprises a slider arm 1170, at one end of which is a slider head 1174 presenting a generally flat contact surface 1178. The actuator 1118 is in the form of a pneumatic cylinder, although actuator 1118 may be a solenoid or other electromagnetic actuator, or other actuator capable of providing translational motion of the slider arm 1170.

In operation, as the row unit 16 proceeds in the direction identified by arrow 38 in a seeding application, the seed disk 300 rotates about the axis 324 of the seed disk by a seed disk motor or other direct or indirect motive device (not shown). With respect to FIG. 18, the disk 300 rotates clockwise. A pressure differential is developed across a portion of the disk 300 as previously described for retaining seed on the front face 304. Concurrently, the endless member 640 is driven counterclockwise with respect to FIG. 18, also as previously described.

As the adhered seed approaches the second end 418 of the vacuum seal 410, the seed diverter 1100 is configured to contact and guide the seed to affect that seed's trajectory into the seed delivery apparatus 180.

Specifically, the actuator 1118 receives and exhausts a controlled supply of pressurized air (which may be associated with the system operating to provide the air pressure differential) to translate (i.e., retract and extend from a first position to a second position) the slider mechanism 1114 in coordination with a rotation rate of the endless member 640, accounting for the angular velocity of the disk 300, the radial distance of the row of apertures 320, and the circumferential spacing between apertures 320 such that the contact surface 1178 contacts a seed at or very nearly in concert with the termination of the pressure differential as the subject aperture 320 passes over the second end 418 of the vacuum seal 410. Alternatively, the controller receives sensor information from the flight 660 or aperture 320 position sensor(s) and/or motor position data and coordinates motion of the actuator 1118 accordingly.

Referring again to FIG. 18, the slider head 1174 during extension reaches a second or extended position at which the contact surface 1178 contacts the seed to guide the seed through the opening 630 and into a seed receptacle 670. In some embodiments, the slider head 1174 extends wholly into the seed receptacle 670, in other embodiments the slider head 1174 extends partially into the seed receptacle 670, and in yet other embodiments the slider head 1174 at full extension does not extend into the seed receptacle 670. Additionally, in some embodiments, contact with the seed occurs before full extension of the slider arm 1170. Once past full extension, the actuator 1118 drives the slider arm 1170 back to the first or retracted position, at which point the extension/retraction cycle begins anew.

Due to the above variables, the retraction rate need not be identical to the extension rate, and in some embodiments the rate of retraction of the slider arm 1170 may be slower than the rate of extension. In other embodiments the slider arm 1170 may remain in the retracted position for a time period before the extension motion is executed.

Figure 19:
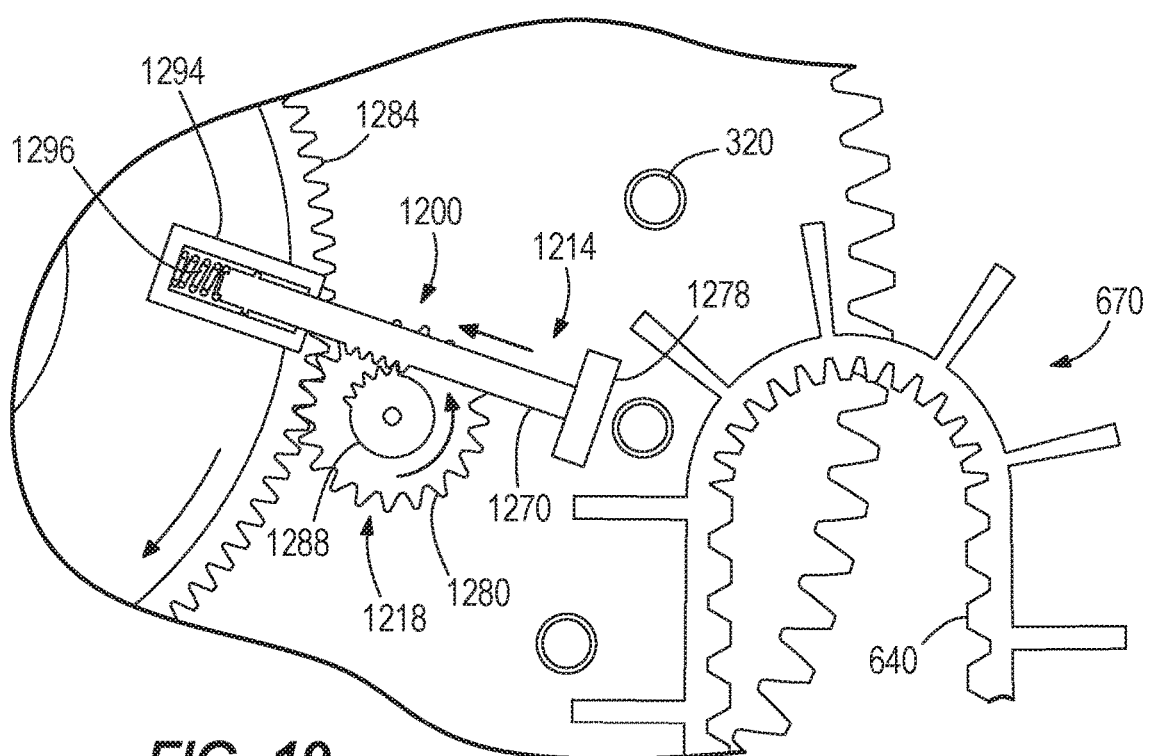
FIG. 19 is a side view of another seed diverter during retraction.
Figure 20:
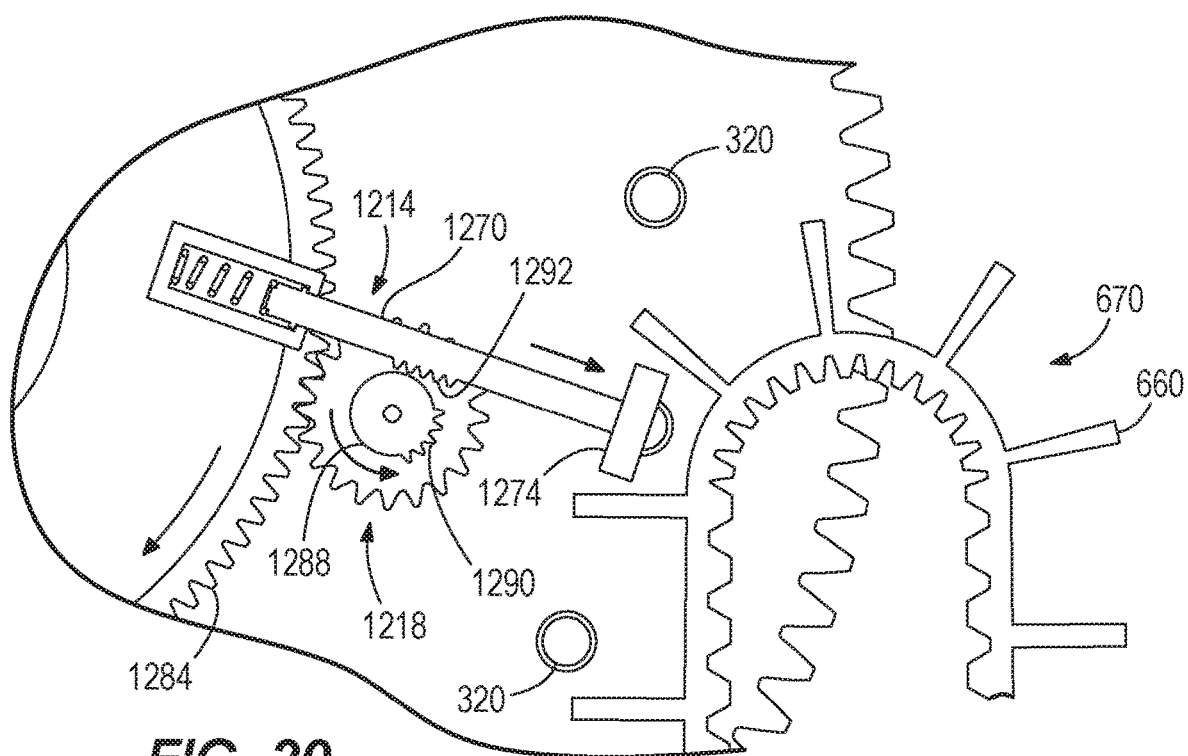
FIG. 20 is a side view of the seed diverter of FIG. 19 during extension.

Referring to FIGS. 19 and 20, a seed diverter 1200 includes a slider mechanism 1214 and an actuator 1218.

The slider mechanism 1214 comprises a slider arm 1270, at one end of which is a slider head 1274 presenting a generally flat contact surface 1278. The actuator 1218 is in the form of a pinion 1280 engageable with a set of teeth 1284 integrally formed as part of or separately affixed to the seed disk 300. The pinion 1280 includes an axially offset concurrently rotatable partially toothed portion 1288 with teeth 1290 configured to engage mating teeth 1292 formed on a portion of the slider arm 1270. A second end of the slider arm 1270 is positioned within a slider receiver 1294, which also contains a spring 1296 therein.

In operation, the seed diverter 1200 is configured to contact and guide the seed to affect that seed's trajectory into the seed delivery apparatus 180. In particular, the pinion 1280 engages the teeth 1284 to rotate in a counterclockwise direction with rotation of the disk 300, concurrently rotating the offset partially toothed portion 1288 about the axis of the pinion 1280. During a portion of the rotation of the offset portion 1288, the teeth 1290 engage the teeth 1292 to retract the slider arm 1270 into the receiver 1294 against the force of the spring 1296. Referring to FIG. 19, the slider arm 1270 is in a fully retracted position, as the end tooth of the set of teeth 1290 is engaged with the end tooth of the set of teeth 1292. Once such engagement ceases upon further rotation of the pinion 1280, the force of the spring 1296 translates the slider arm 1270 to a fully extended position, as shown in FIG. 20 and in the same relationship with the endless member 640 previously described. As the offset portion 1288 continues to rotate with the pinion 1280, the teeth 1290 reengage the teeth 1292 to retract the slider arm 1270 and repeat the cycle.

Figure 21:
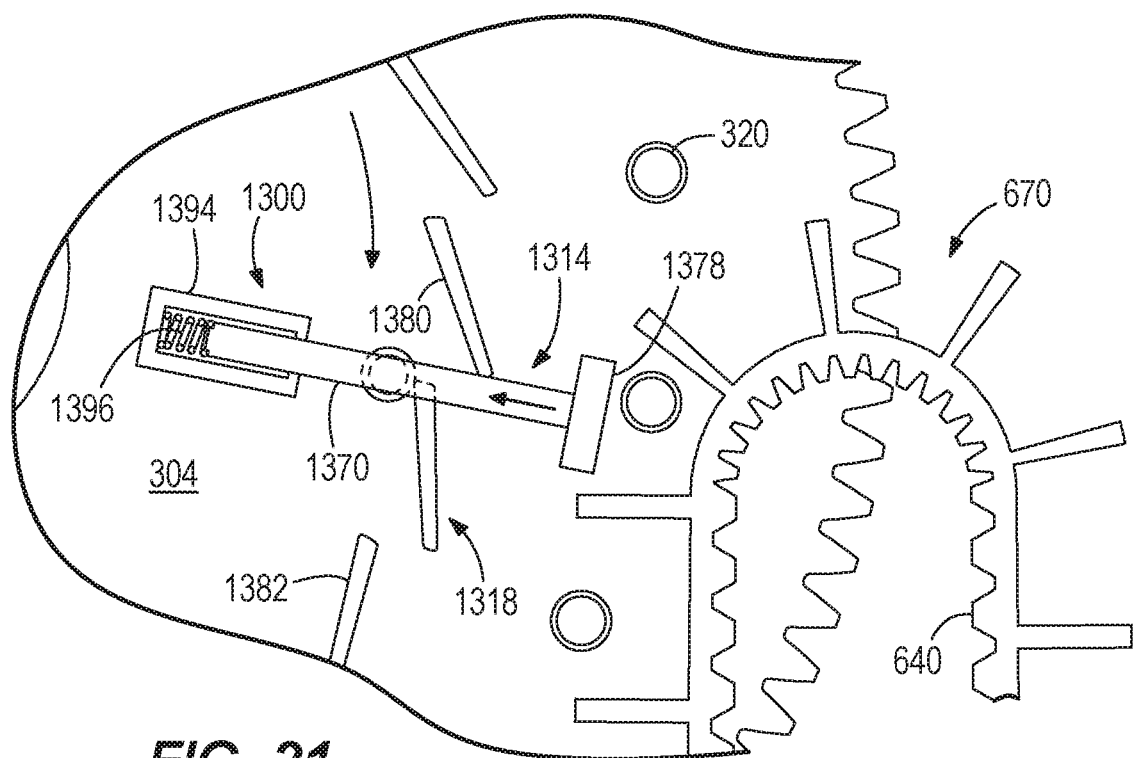
FIG. 21 is a side view of another seed diverter during retraction.
Figure 22:
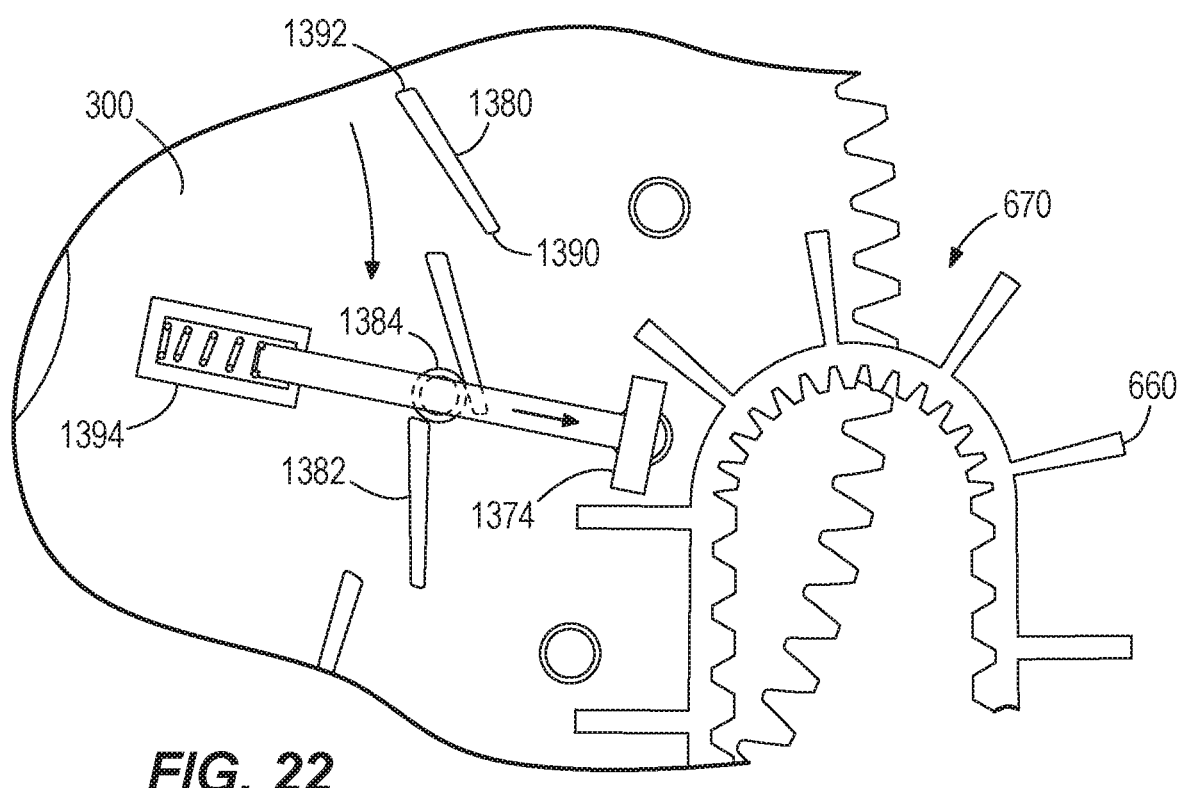
FIG. 22 is a side view of the seed diverter of FIG. 21 during extension.

Referring to FIGS. 21 and 22, the seed diverter 1300 is similarly configured to the seed diverter 1200 but with another type of actuator. The seed diverter 1300 includes a slider mechanism 1314 and an actuator 1318.

The slider mechanism 1314 comprises a slider arm 1370, at one end of which is a slider head 1374 presenting a generally flat contact surface 1378. The actuator 1318 is in the form of a series of radially-oriented ramps 1380 fixed onto the seed disk 300 and rotatable therewith, each ramp 1380 having a ramp surface 1382. The ramp surface 1382 is oriented such that a first end 1390 is radially further from the disk axis 324 than is a second end 1392. Each ramp surface 1382 is positioned to contact an axial protrusion 1384 formed as part of or coupled to the slider arm 1370, as will be further detailed. The protrusion 1384 may include an arcuate outer surface and may or may not be rotatable. A second end of the slider arm 1370 is positioned within a slider receiver 1394, which also contains a spring 1396 therein.

In operation, the seed diverter 1300 is configured to contact and guide the seed to affect that seed's trajectory into the seed delivery apparatus 180. In particular, the ramps 1380 rotate with the seed disk 300 such that the contact surface 1382 of a first ramp 1380 abuts the protrusion 1384. As illustrated, the interaction of the contact surface 1382 with the protrusion 1384 results in a linear ramp effect on the protrusion 1384. The effect drives the slider arm 1370 further into the receiver 1394, retracting it against the spring 1396. Referring to FIG. 21, the slider arm 1370 is in a fully retracted position, as the second end 1392 is in contact with the protrusion 1384. Once such contact ceases due to further rotation of the disk 300, the force of the spring 1396 translates the slider arm 1370 to a fully extended position, as shown in FIG. 22, with the protrusion 1384 abutting at or near the first end 1390 of a second or subsequent ramp 1380 and the slider head 1374 in the same relationship with the endless member 640 as previously described for other slider mechanism embodiments. As the disk 300 continues to rotate, the aforementioned ramp 1380 retracts the slider arm 1370 into the receiver 1394 and against the spring 1396 to repeat the cycle.

Figure 23:
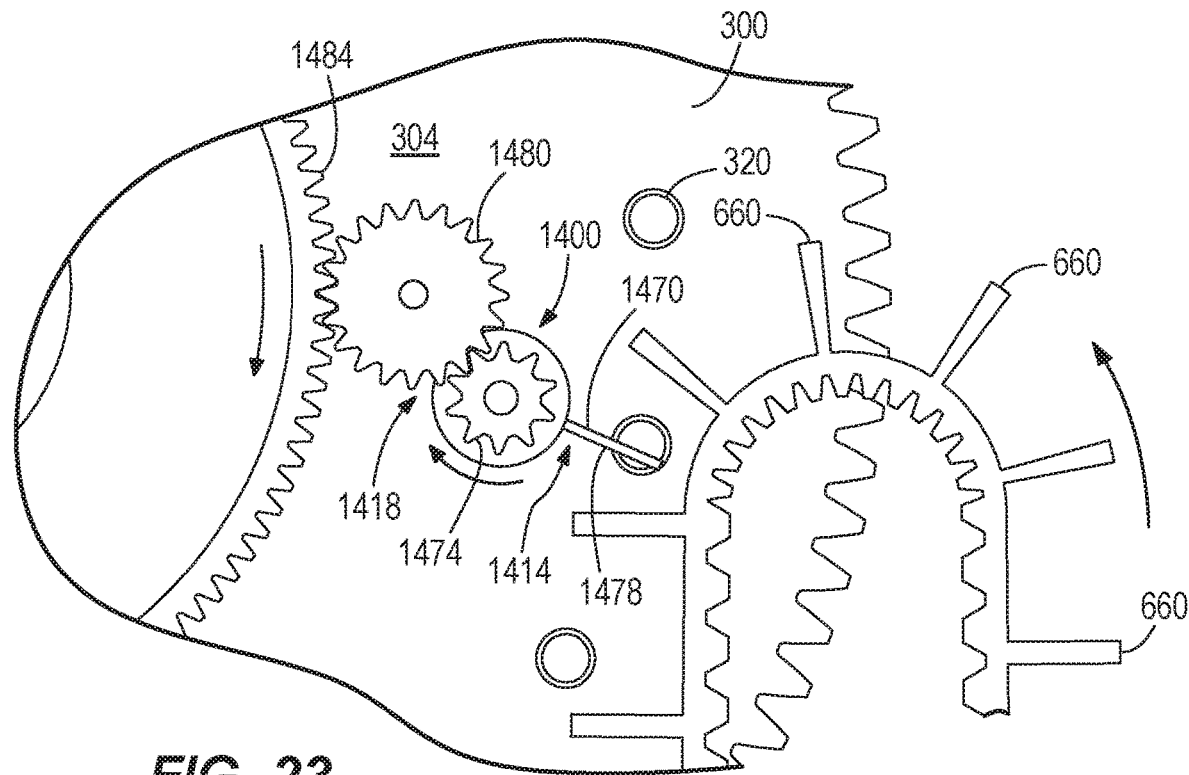
FIG. 23 is a side view of another seed diverter.

Referring to FIG. 23, a seed diverter 1400 in another embodiment includes a rotating mechanism 1414 and an actuator 1418.

The rotating mechanism 1414 comprises a linear projection, such as a paddle 1470 rotatably fixed to a first gear 1474 for rotation therewith. The paddle 1470 presents a contact surface 1478. The actuator 1418 is in the form of a second gear 1480 in mating relationship with the first gear 1474 and further engageable with a set of teeth 1484 integrally formed as part of or separately affixed to the seed disk 300.

In operation, as the seed disk 300 rotates, the second gear 1480 engages the teeth 1484 to rotate in a counterclockwise direction. The engagement between the second gear 1480 and the first gear 1474 rotates the first gear 1474 in a clockwise direction, concurrently rotating the paddle 1470 at a rate synchronous with a rotation rate of the disk 300 such that the contact surface 1478 contacts a seed at or very nearly in concert with the termination of the pressure differential as the subject aperture 320 passes over the second end 418 of the vacuum seal 410.

Referring again to FIG. 23, the paddle 1470 sweeps within an individual receptacle 670 during rotation. The paddle 1470 and gears 1474, 1480 are sized and positioned relative to the disk 300 and timed with the rotation of the flights 660 such that as the belt 640 proceeds counterclockwise in FIG. 23, the paddle 1470 sweeps clockwise within the subject receptacle 670, avoiding contact with the flights 660 forming the receptacle 670 as the paddle 1470 rotation and belt 640 movement are generally aligned for a period of time.

Figure 24:
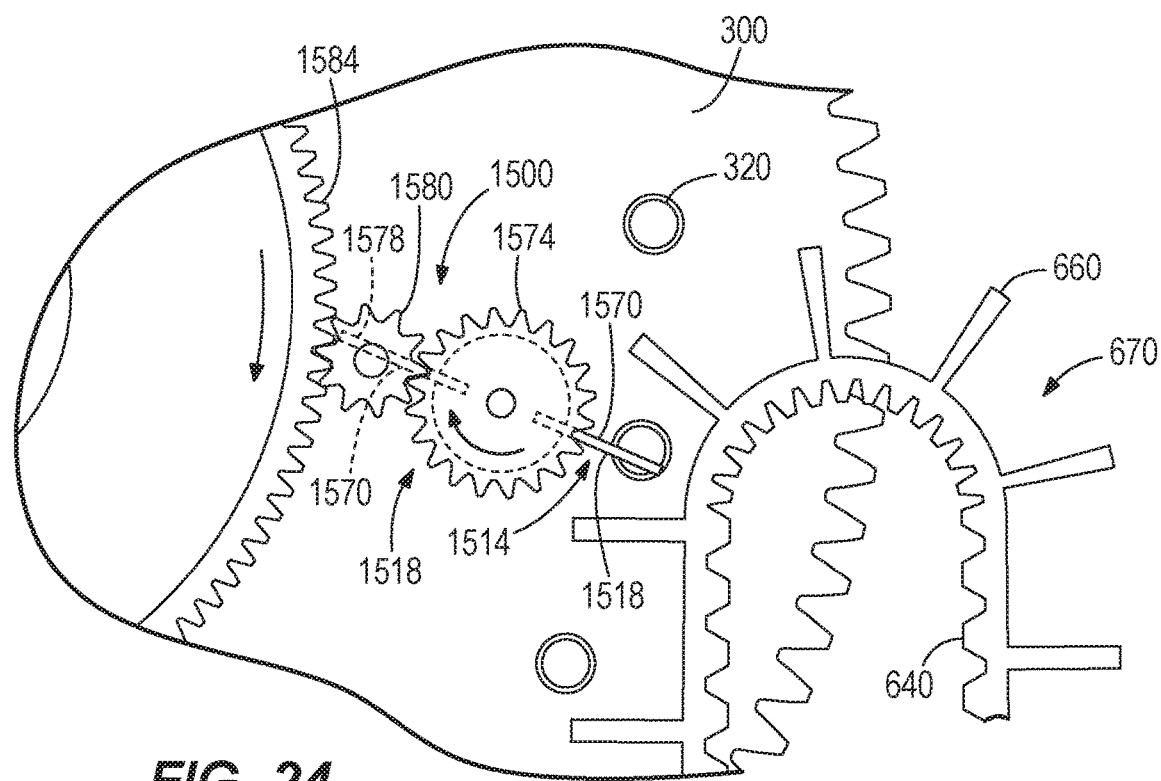
FIG. 24 is a side view of another seed diverter.

Referring to FIG. 24, a seed diverter 1500 in another embodiment includes a rotating mechanism 1514 and an actuator 1518.

The rotating mechanism 1514 comprises opposing linear projections or paddles 1570 rotatably fixed to a first gear 1574 for rotation therewith. The paddles 1570 each present a contact surface 1578. The actuator 1518 is in the form of a second gear 1580 in mating relationship with the first gear 1574 and further engageable with a set of teeth 1584 integrally formed as part of or separately affixed to the seed disk 300.

In operation, as the seed disk 300 rotates, the second gear 1580 engages the teeth 1584 to rotate in a counterclockwise direction. The engagement between the second gear 1580 and the first gear 1574 rotates the first gear 1574 in a clockwise direction, concurrently rotating the paddles 1570 at a rate synchronous with a rotation rate of the disk 300 such that the contact surface 1578 of one of the paddles 1570 contacts a seed at or very nearly in concert with the termination of the pressure differential as the subject aperture 320 passes over the second end 418 of the vacuum seal 410.

Referring again to FIG. 24, each paddle 1570 sweeps within an individual receptacle 670 during rotation. In particular, the relationship between the gears 1574, 1580 is such that one of the paddles 1570 sweeps within a first receptacle 670 and the other of the paddles 1570 sweeps within the following receptacle 670. As with the embodiment of FIG. 23, the paddle 1570 and gears 1574, 1580 are sized and positioned relative to the disk 300 and timed with the rotation of the flights 660 such that as the belt 640 proceeds counterclockwise in FIG. 24, each paddle 1570 sweeps clockwise within the subject receptacle 670, avoiding contact with the flights 660 forming the receptacle 670 as the paddle 1570 rotation and belt 640 movement are generally aligned for a period of time.

In other embodiments, more than two paddles 1570 may be implemented with proper sizing of gears 1574, 1580.

Figure 25:
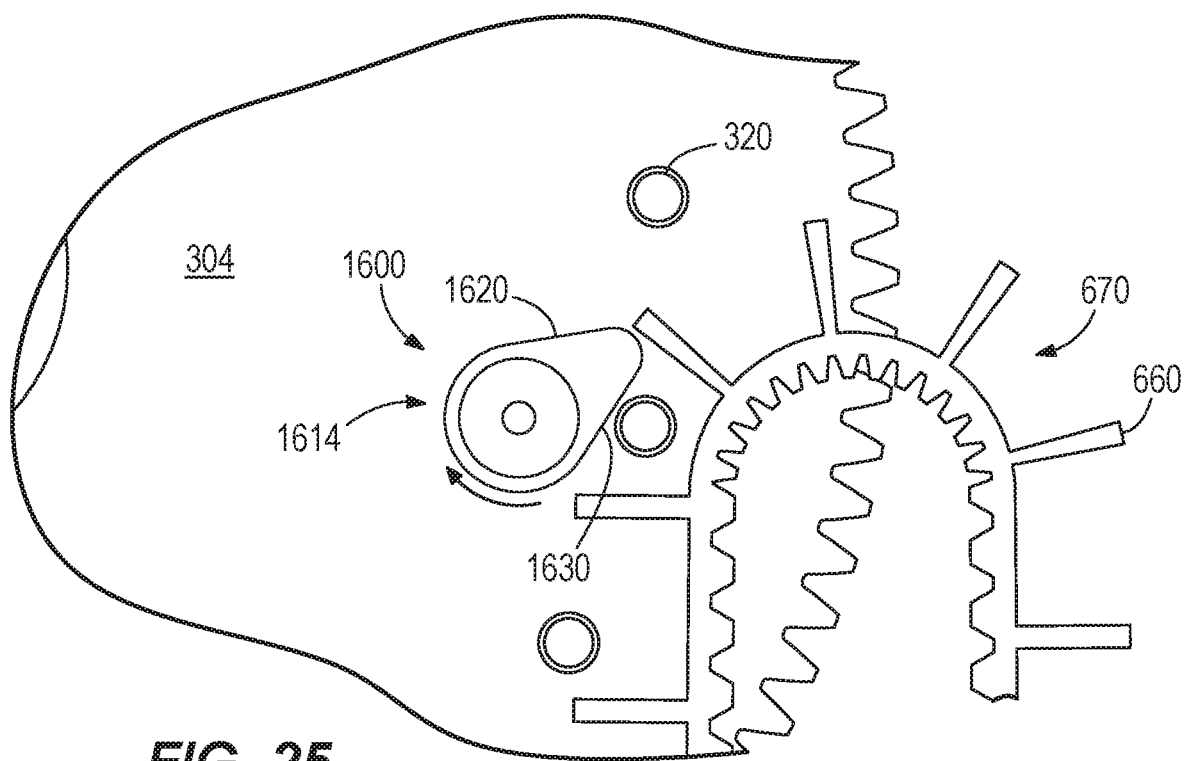
FIG. 25 is a side view of another seed diverter.

Referring to FIG. 25, a seed diverter 1600 in another embodiment includes a rotating cam 1614 actuated by the aforementioned motor 800 previously described. The rotating cam 1614 includes a cam body 1620 presenting a contact surface 1630.

In operation, the motor 800 rotates at a predetermined rate that accounts for the angular velocity of the disk 300, the radial distance of the row of apertures 320, and the circumferential spacing between apertures 320 such that the contact surface 1630 contacts a seed to guide the seed into a seed receptacle 670. In a similar manner to the paddle 1470, the cam body 1620 at least partially sweeps within an individual receptacle 670 during rotation and is sized and positioned and further timed via motor 800 with the rotation of the flights 660 such that as the belt 640 proceeds counterclockwise in FIG. 25, the body 620 sweeps clockwise within the subject receptacle 670, avoiding contact with the flights 660 forming the receptacle 670 as the body 620 rotation and belt 640 movement are generally aligned for a period of time.

Figure 26:
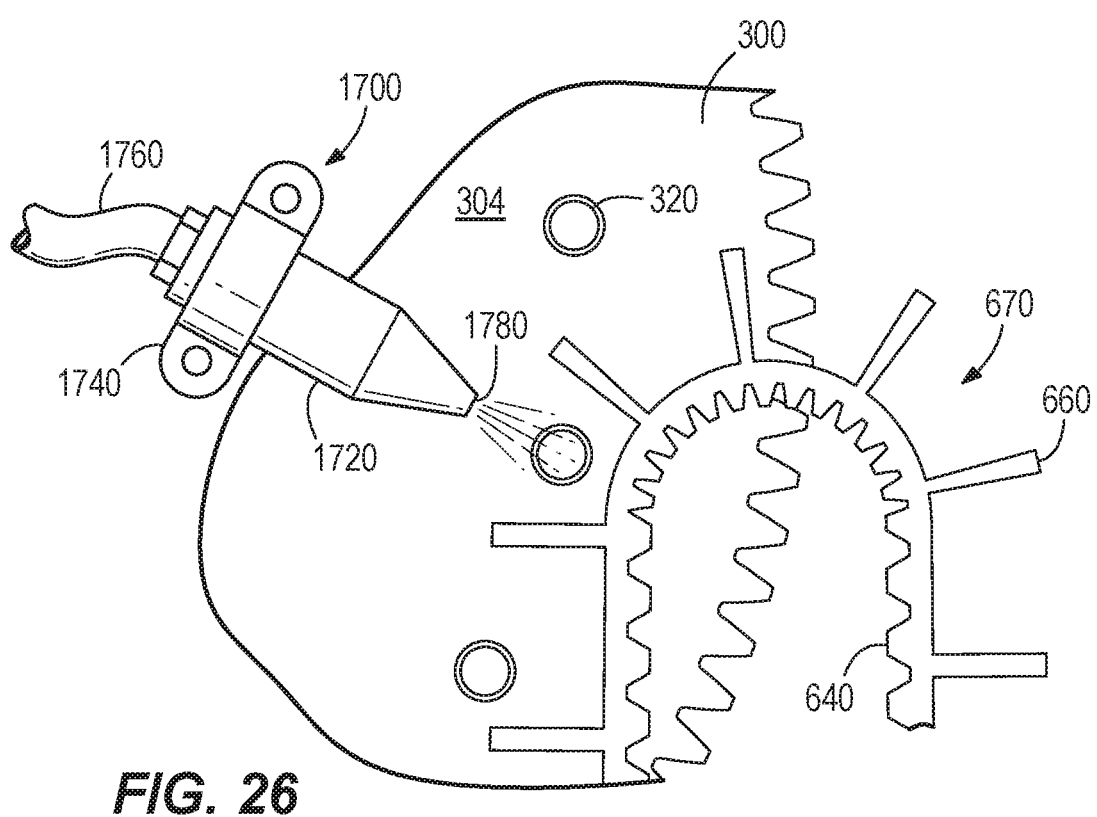
FIG. 26 is a side view of another seed diverter.
Figure 27:
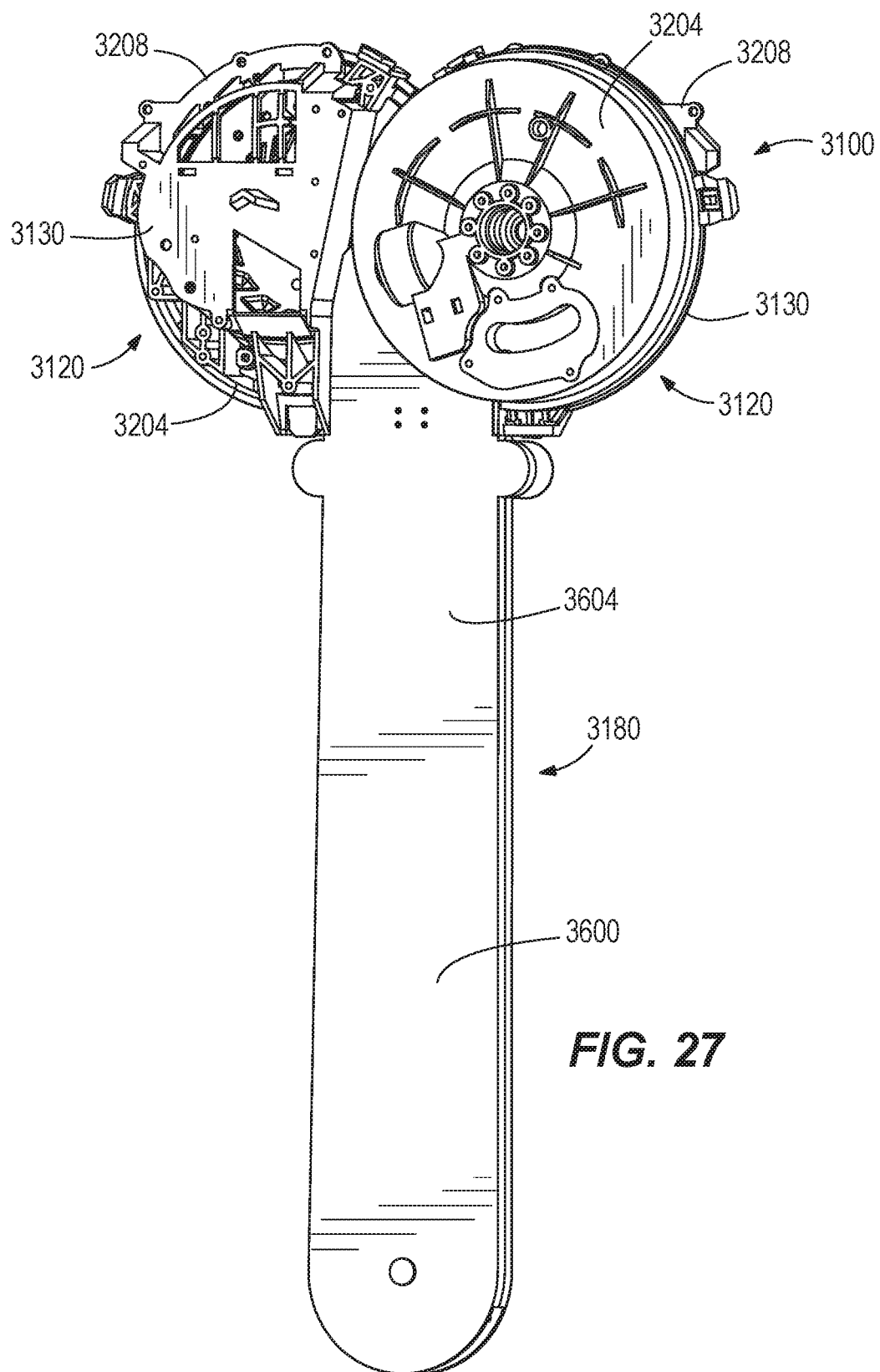
FIG. 27 is a perspective view of a first side of another seeding machine for a row unit.
Figure 28:
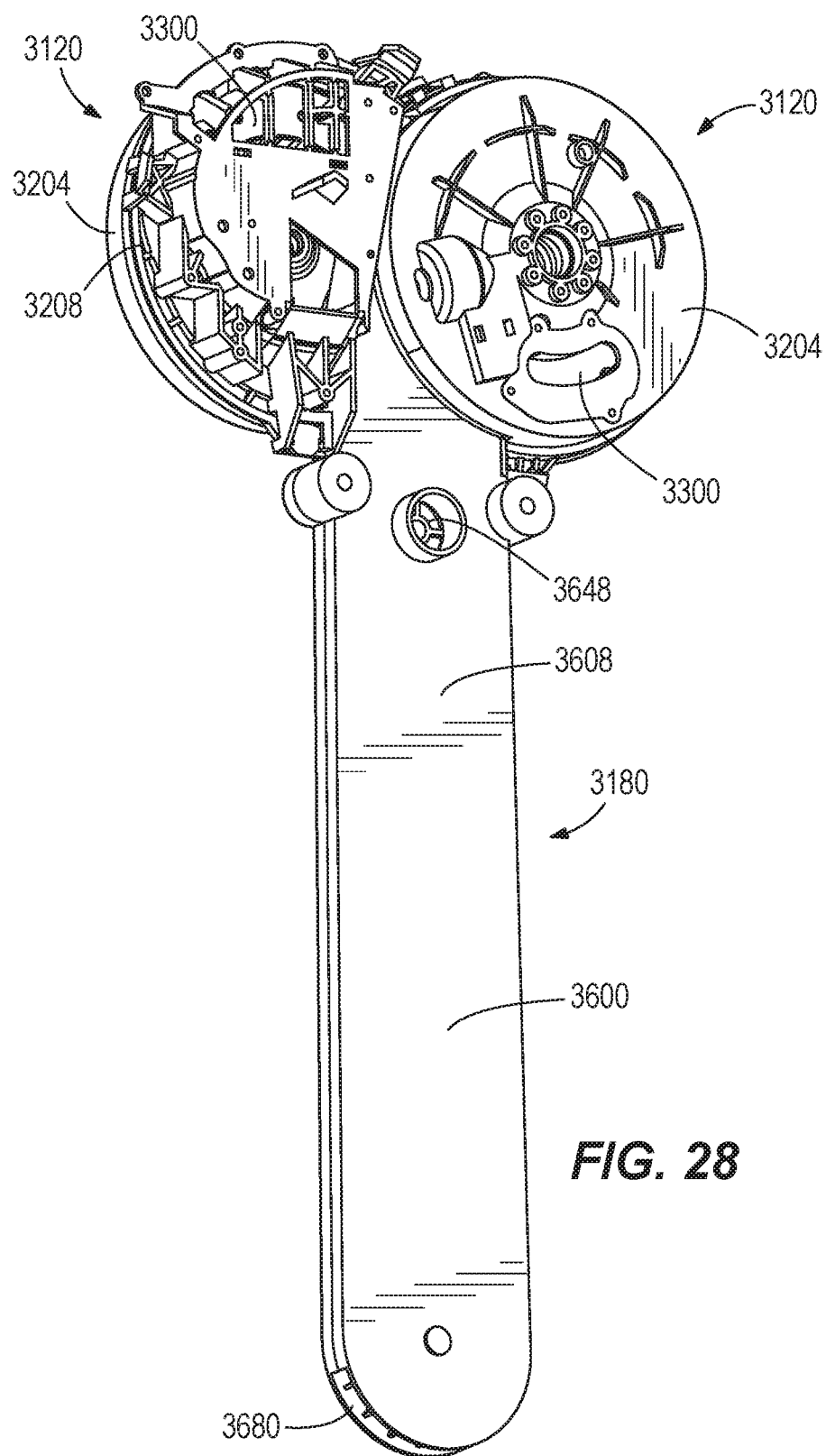
FIG. 28 is a perspective view of a second side of the seeding machine of FIG. 27.

Referring to FIG. 26, another seed diverter 1700 includes a nozzle 1720 fixed to the inside surface 748 of the front housing half 204 with a bracket 1740 and in fluid communication with a supply of pressurized air through a pipe, tube, or other conduit 1760. The nozzle 1720 may take any form leading to a tip or outlet 1780 suitable to direct a jet of air therefrom.

In operation, the seed disk 300 rotates about the axis 324 as previously described and a pressure differential is developed across a portion of the disk 300 while the endless member 640 is driven counterclockwise with respect to FIG. 26.

As the adhered seed approaches the second end 418 of the vacuum seal 410, the seed diverter 1700 is configured to provide a flow or jet of air that affects the seed's trajectory, i.e., that contacts the seed and guides or directs the seed into a seed receptacle 670.

Specifically, the actuator nozzle 1720 receives a controlled supply of pressurized air (which may be associated with the system operating to provide the air pressure differential) in coordination with a rotation rate of the endless member 640, again accounting for the angular velocity of the disk 300, the radial distance of the row of apertures 320, and the circumferential spacing between apertures 320, and directs the supply as illustrated toward and across a seed at or very nearly in concert with the termination of the pressure differential as the subject aperture 320 passes over the second end 418 of the vacuum seal 410. Alternatively, the controller receives sensor information from the flight 660 or aperture 320 position sensor(s) and/or motor position data and coordinates the supply of air accordingly.

Referring to FIGS. 27-39, another type of seed meter and delivery system (collectively a seeding machine) is illustrated for use with the row unit 16. The seeding machine 3100 includes a first seed meter 3120 having seed meter housing 3130 containing a seed disk therein, a second axially offset opposed seed meter 3120 having a seed meter housing 3130 containing a seed disk therein, and a seed delivery apparatus 3180 therebetween. The aforementioned air or vacuum system 150, or a variation thereof, and in some applications a mini-hopper 160, or a variation thereof, may be used with the seeding machine 3100.

Each seed meter housing 3130 comprises first and second halves or portions 3204, 3208 releasably joinable or couplable using a plurality of housing coupling pairs, similar to those previously described with respect to housing halves 204, 208, and consequently also forms a lower region or seed reservoir 3510 in the same manner.

Referring also to FIGS. 29-32, the seed disks 3300 in the illustrated embodiment are in the form of a generally flat disk. Each disk 3300 has a front side or face 3304 and a rear side or face 3308. The front side 3304 may further be defined as a seed side and the rear side 3308 may be defined as a vacuum side. A row of circumferentially spaced apertures 3320 at a fixed radius from each disk axis 3324 is arranged around a circular path radially inward of the edge or periphery 3330 of each disk 300. Each aperture 3320 extends through the disk 3300 between the rear side 3308 and the front side 3304, as previously described. The disk apertures 3320 have on the front face 3304 a flat or planar surrounding disk surface or, alternatively, the apertures 3320 are surrounded by seed cells. The front face 3304 may optionally include a plurality of seed agitators 3340 at a radial position relative to the apertures 3320. Each disk 3300 is rotatably mounted to a hub and to the shaft of a motor or other motive device (not shown) in the same manner and with the same variations and alternatives as disk 300. The disks 3300 may be identical, or they may be differently configured (e.g., different circumferential spacing between apertures 3320, differently sized apertures 3320, differently shaped agitators 3340) if two different seed types are to be planted.

The seed delivery apparatus 3180 includes an elongated housing 3600 with first and second wall sections 3604, 3608 defining an interior chamber 3624. An inlet opening 3630 (FIG. 33) in the housing 3600 communicates the interior chamber 3624 with the seed meter interior.

Figure 29:
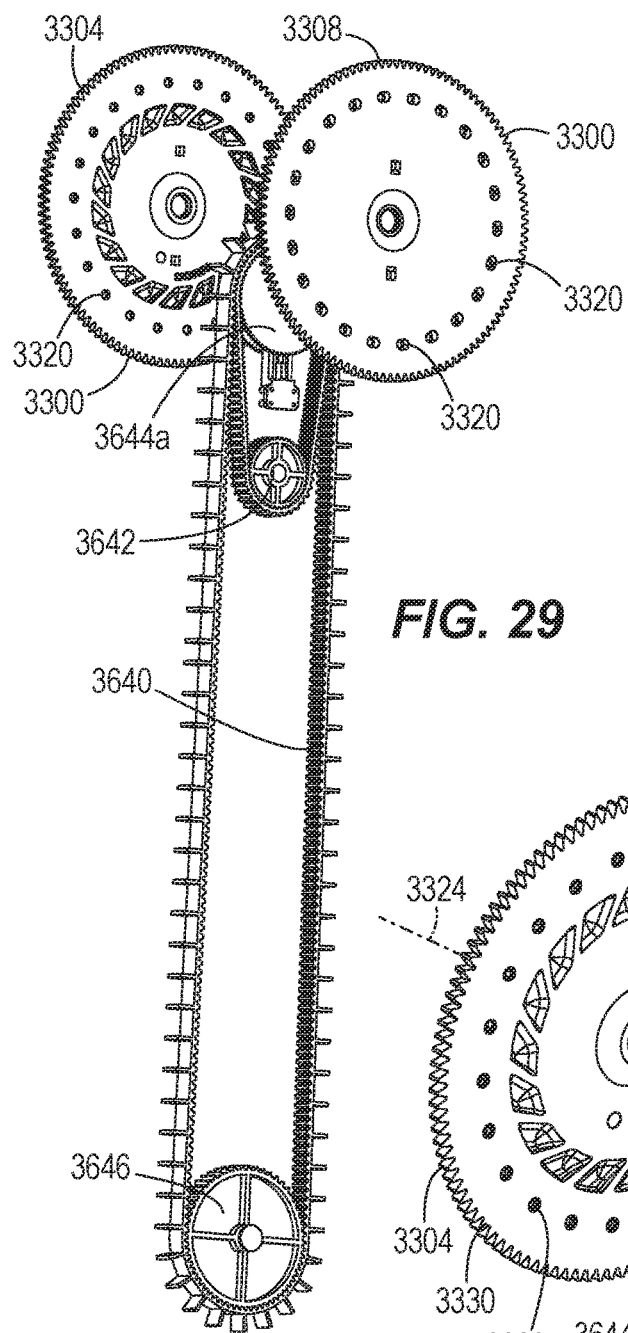
FIG. 29 is a perspective view of the second side of the seeding machine of FIG. 27 with all cover portions removed.
Figure 30:
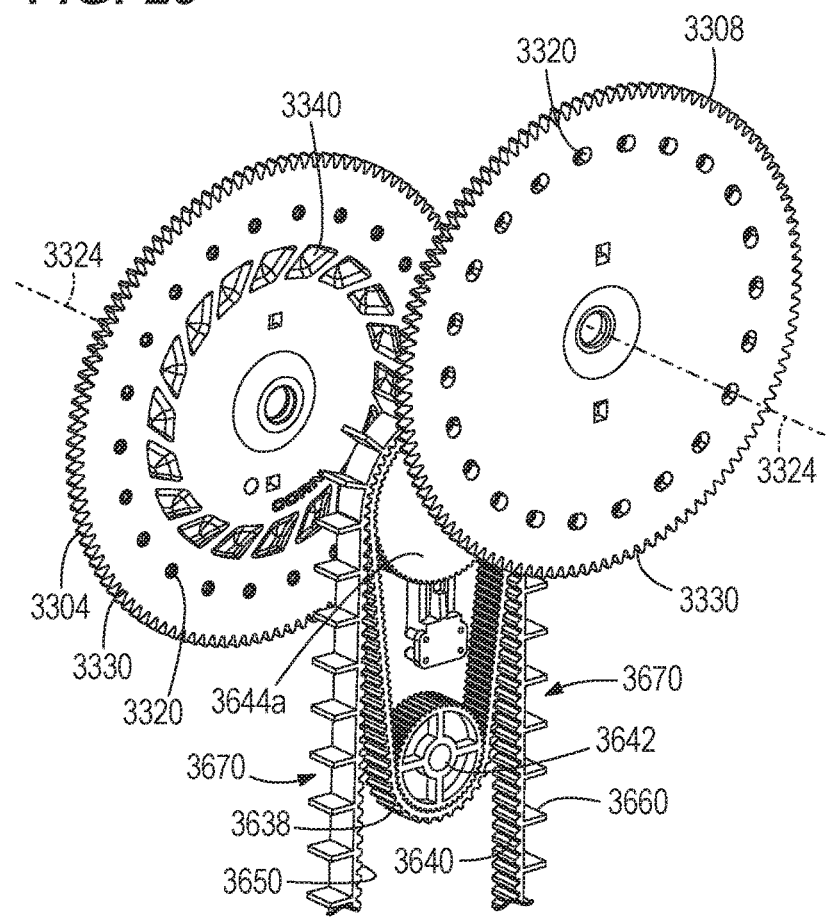
FIG. 30 is another perspective view of the second side of the seeding machine of FIG. 27 with all cover portions removed.
Figure 31:
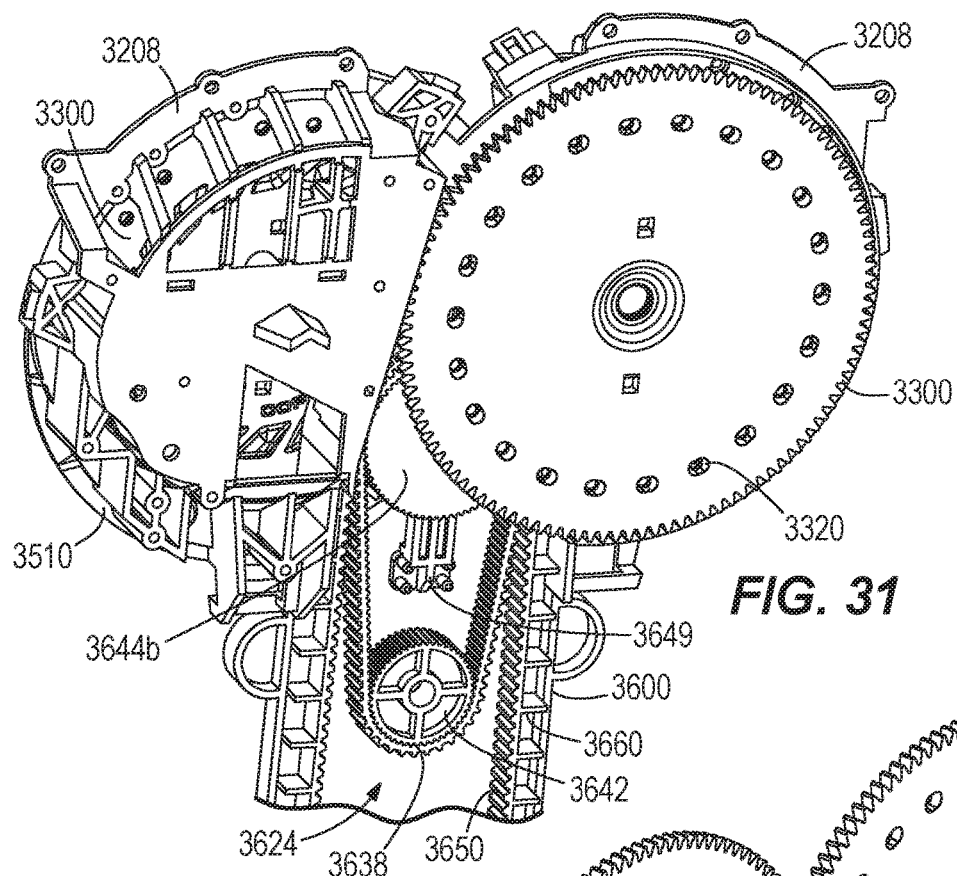
FIG. 31 is another perspective view of the first side of the seeding machine of FIG. 27 with certain cover portions removed.
Figure 32:
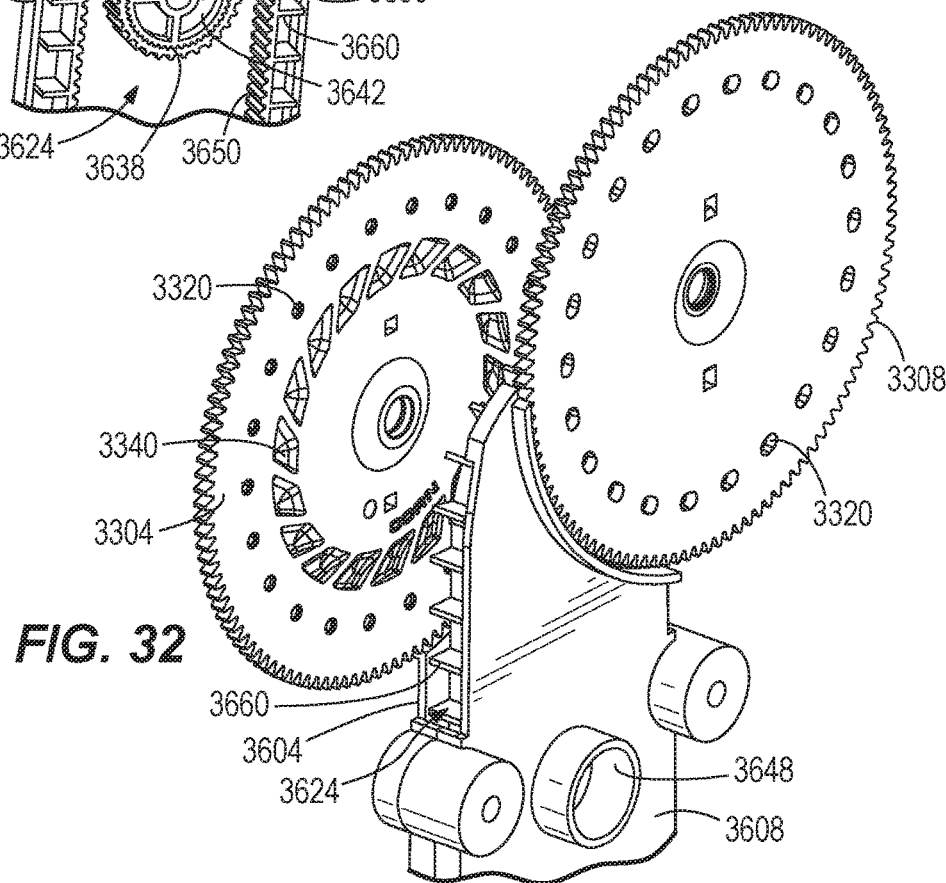
FIG. 32 is another perspective view of the first side of the seeding machine of FIG. 27 with certain cover portions removed.
Figure 33:
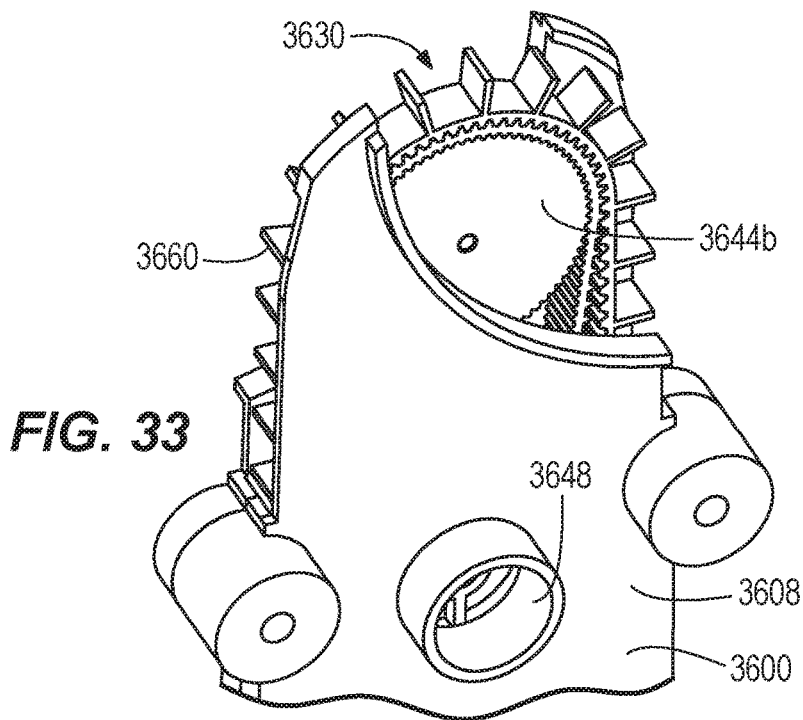
FIG. 33 is a perspective view of select components of the seed delivery apparatus of the seeding machine of FIG. 27.
Figure 39:
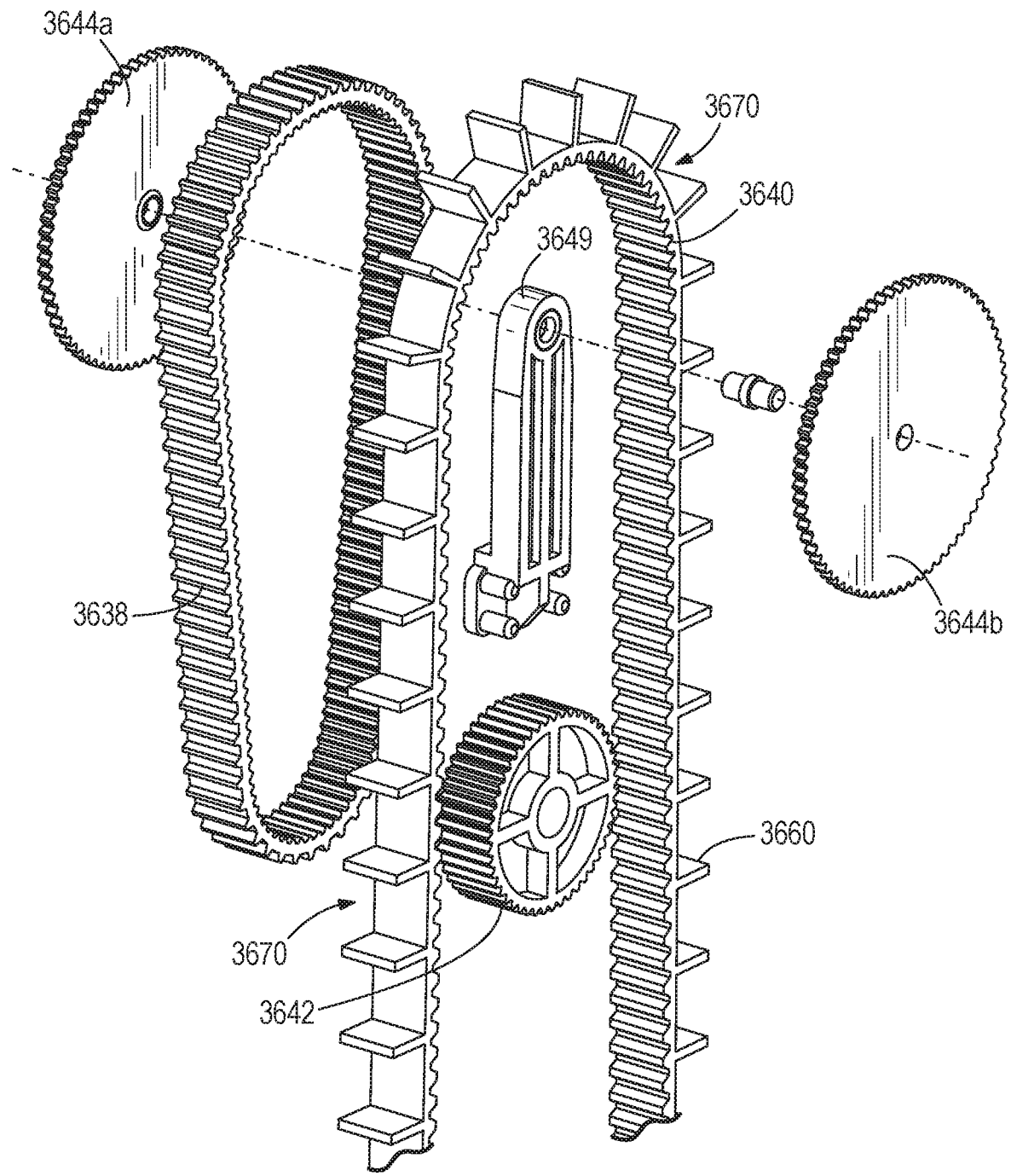
FIG. 39 is an exploded view of select components of the seed delivery apparatus.

Referring also to FIGS. 29, 32, and 39, the seed delivery apparatus 3180 includes three pulleys mounted inside the housing 3600, as well as a pair of endless members or belts 3638, 3640. One of the pulleys is a drive pulley 3642 and the other two are idler pulleys 3644, 3646. The first belt 3638 drivingly connects the drive pulley 3642 with idler pulley 3644. The drive pulley 3642 is connected to the shaft of a motor or other motive device (not shown) through an aperture 3648 in the housing 3600 and in the same manner and with the same variations and alternatives as drive pulley 642. Idler pulley 3644 is fixed to the housing 3600 through mount 3649. In the illustrated embodiment, the idler pulley 3644 comprises aligned pulley plates 3644a, 3644b on either side of mount 3649.

A base member 3650 of the belt 3640 engages pulley 3646 and meshes with belt 3638. Flights 3660 extend from the base member 3650 to form seed receptacles 3670, preferably evenly sized and spaced. In other embodiments, the belt 3640 may instead have elongated bristles (not shown) extending from the base 3650 to a position at or near the inner surface of the housing 3600 at the juncture or abutment of the wall sections 3604, 3608. The first and second wall sections 3604, 3608 form an exit opening 3680 generally opposite the inlet opening 3630.

Figure 36:
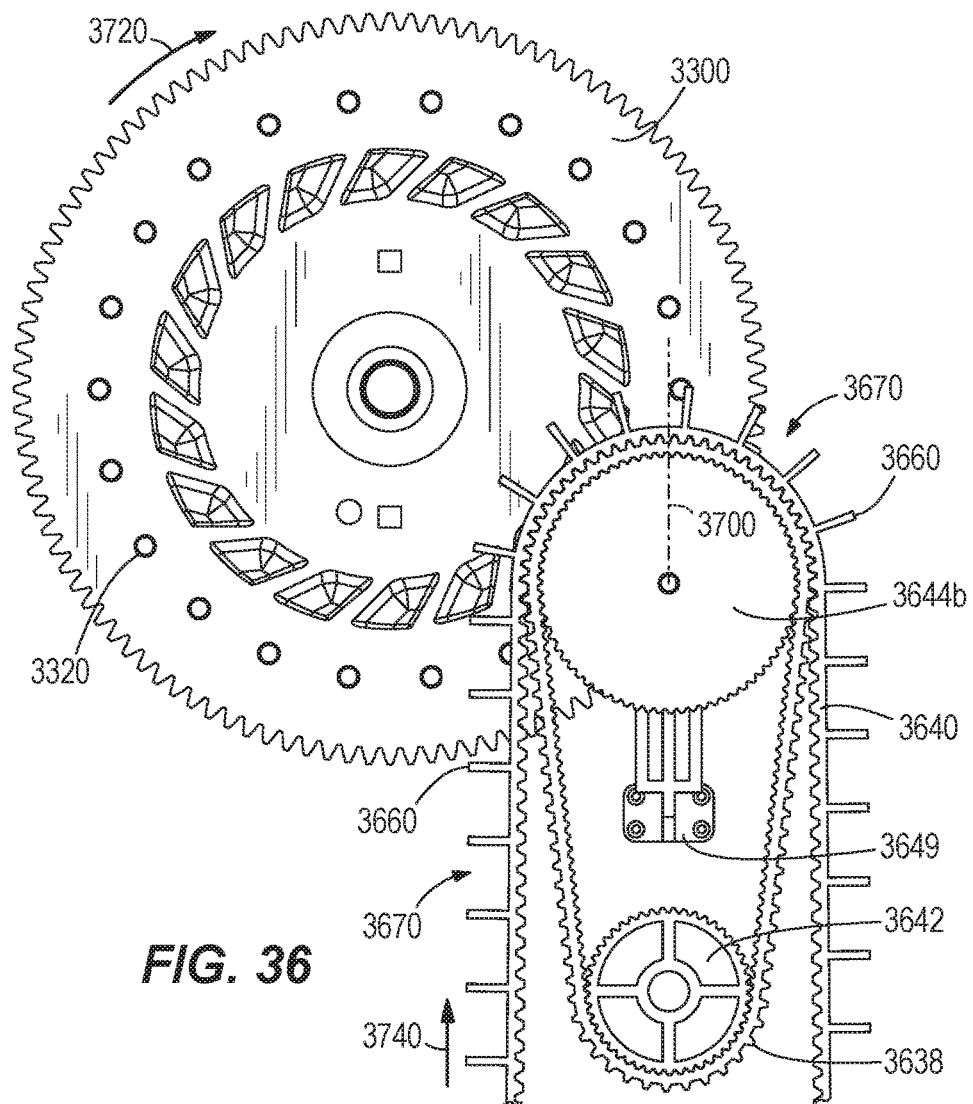
FIG. 36 is a side view of select components of the second side of the seeding machine of FIG. 27.
Figure 37:
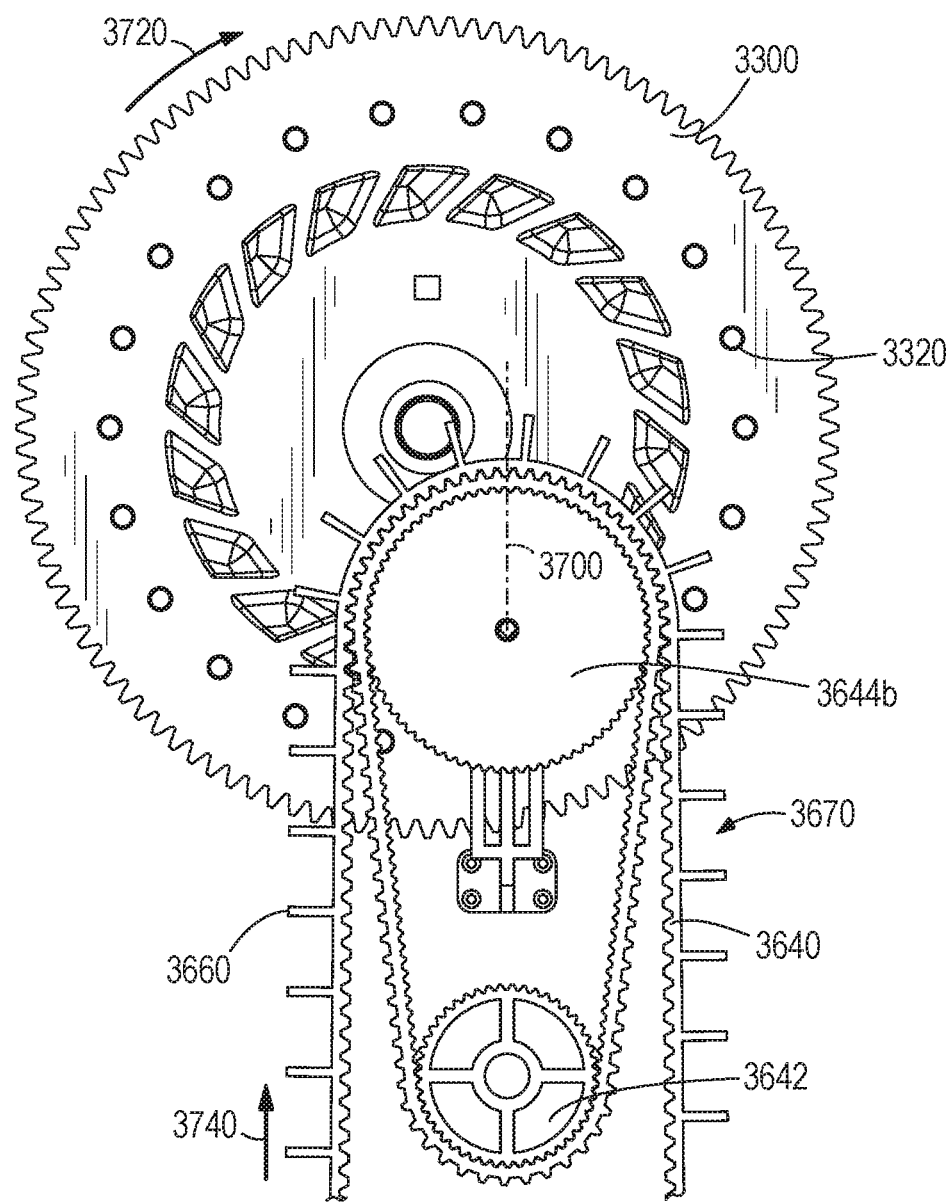
FIG. 37 is a side view of select components of the second side of the seeding machine of FIG. 27 in another configuration.
Figure 38:
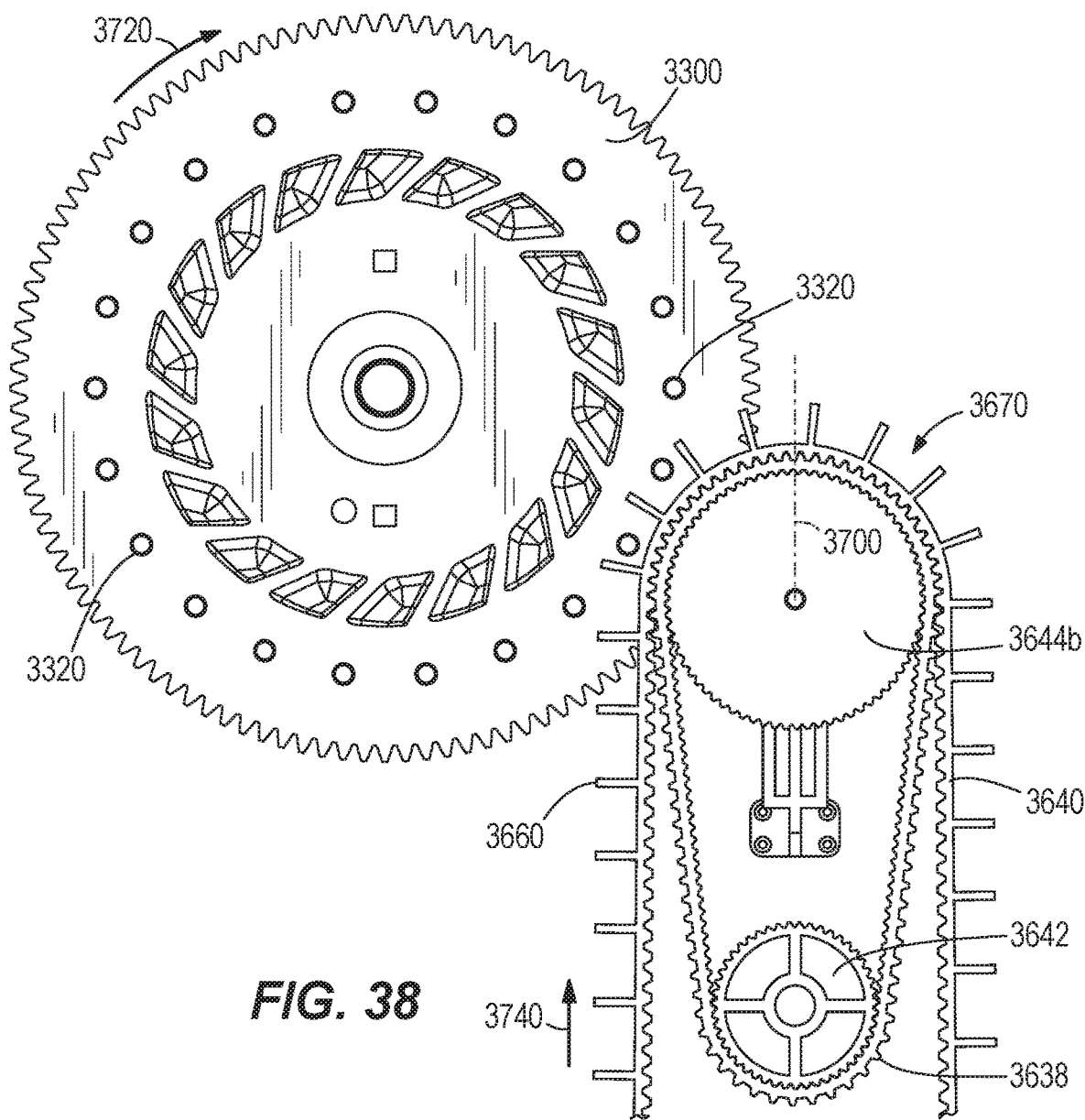
FIG. 38 is a side view of select components of the second side of the seeding machine of FIG. 27 in another configuration.

The seed disks 3300 and the front and rear walls 3604, 3608 of the housing 3600 lie in generally parallel planes, which themselves are generally parallel to the direction of travel of the row unit 16. As illustrated, the pulleys 3642, 3644, 3646 and belts 3638, 3640 are positioned axially between the disks 3300. Additionally, referring to FIG. 36, the components of the delivery apparatus 3180 need not be positioned precisely between the axes 3324, 3324. In some embodiments, the pulleys 3644a, 3644b may be shifted toward one of the axes 3324, as shown in FIGS. 37 and 38, with or without an identical shift of pulleys 3642, 3646. The effect of such a shift is to move any given receptacle 3670 configured to receive a seed from one of the disks 3300 more to either side of a "12 o'clock" position 3700 of the pulleys 3644a, 3644b.

Figure 34:
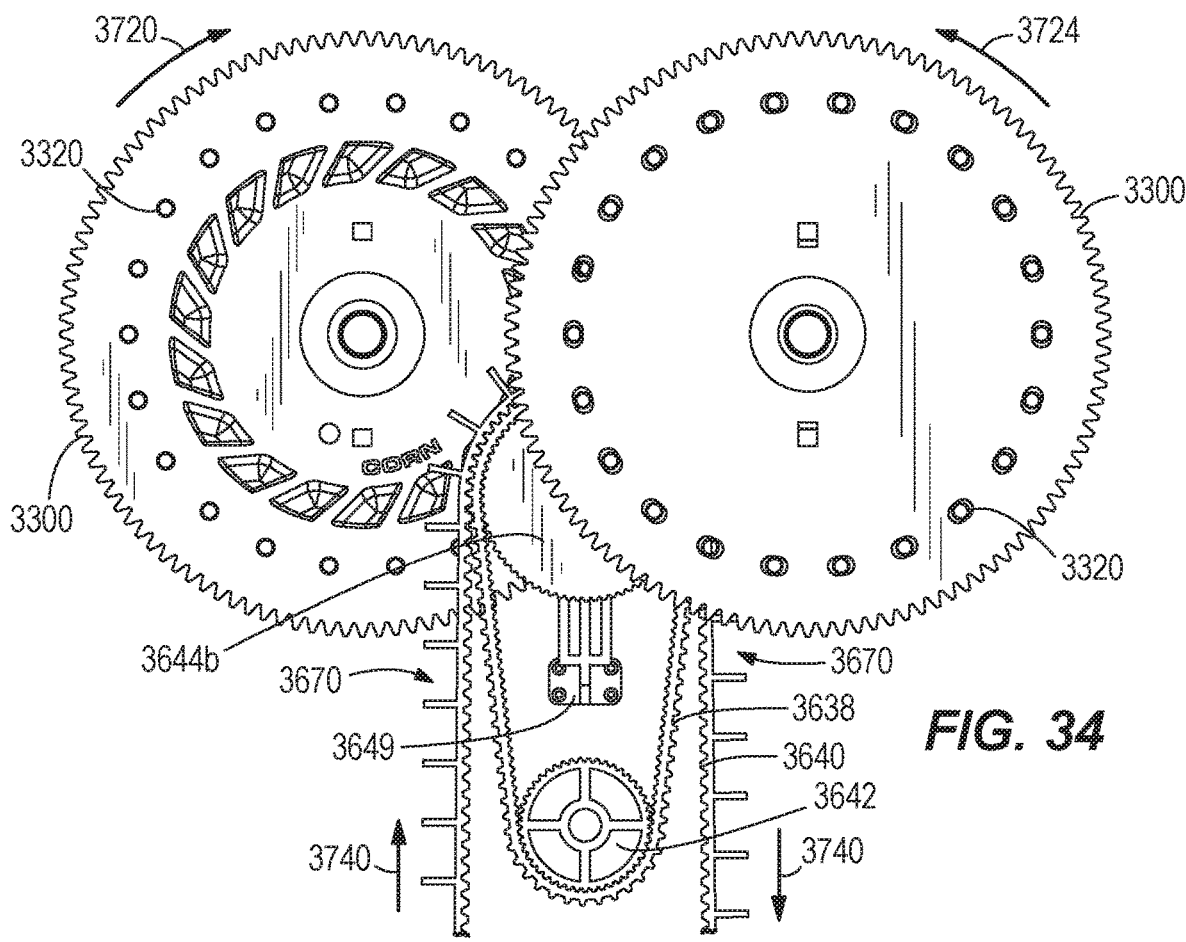
FIG. 34 is a side view of the second side of the seeding machine of FIG. 27.
Figure 35:
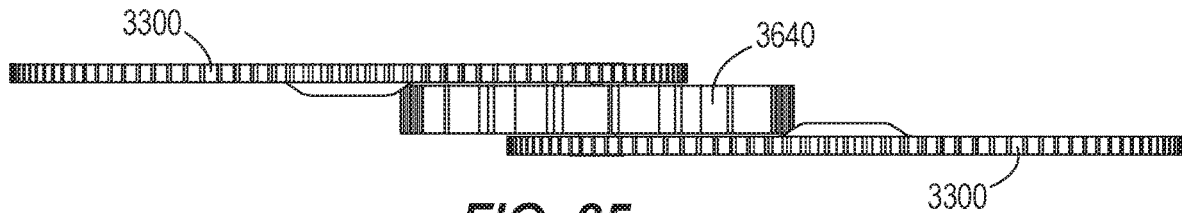
FIG. 35 is a top view of select components of the seeding machine of FIG. 27.

In operation, as the row unit 16 proceeds in the direction identified by arrow 38 in a seeding application, the seed disks 3300 rotate about the respective axes 3324 by the seed disk motors or other direct or indirect motive devices (not shown). Referring to FIG. 34, in any such side view, the near disk 3300 rotates counterclockwise while the far disk 3300 rotates clockwise (see arrows 3720, 3724). As previously described, the disks 3300 need not be identical and could also rotate at different base speeds or rotational velocities about respective axes 3324. In many applications only one disk 3300 will rotate at a time, and the following description will be based on one disk 3300 for clarity.

As previously described with respect to the embodiments of FIGS. 3-26, seeds accumulate in the seed reservoir area 3510. An air or vacuum pump is actuated and a pressure differential developed across a portion of the disk 3300.

As one or more apertures 3320 pass through the seed reservoir area 3510 and the area of low pressure, a force due to the pressure differential between the sides 3304, 3308 of disk 3300 retains seed on the front face 3304 at each aperture at which the pressure differential is applied. A doubles eliminator (not shown) located within the housing 3130 removes excess seeds from each aperture 3320 such that one seed per aperture travels with the associated aperture 3320 as the disk 3300 rotates. Additional components within the seed meter housing 3130 need not be operationally described.

Concurrently, the drive pulley 3642 of the seed delivery apparatus 3180 rotates to drive the endless member 3638 cooperatively with forward movement of the seeding machine 10. The interface between belts 3638, 3640 (facilitated by the idler pulleys 3644a, 3644b) within the interior chamber 3624 drives the belt 3640 in the direction shown by arrows 3740. The flights 3660 are designed such that the receptacles 3670 pass across the opening 3630 (FIG. 33) to receive seed and thereafter pass across the exit opening 3680 (FIG. 28) to discharge seed. In many embodiments the drive pulley 3642 will have a constant rotational speed. In other embodiments, the drive pulley 3642 tracks the forward seeding speed of the seeding machine 10 and will, for example, rotate to discharge seed from the exit opening 3680 having a directional component opposite to the direction of travel of the seeding machine 10 and at a speed in that direction approximately equal to the forward seeding speed of the seeding machine 10. If the forward seeding speed of the seeding machine 10 changes, the rotational speed of the drive pulley 3642 will adjust to discharge seed from the exit opening 3680 again having a directional component opposite to the direction of travel of the seeding machine 10 and at a new speed in that direction approximately equal to the new seeding speed of the seeding machine 10.

In these and all other embodiments, it may be that the seed drops from the respective aperture 3320 with the release of the pressure differential into the receptacle 3670. Alternatively, in this and all other embodiments, the rearward flight 3660 (of the two flights 3660 that comprise a given receptacle 3670) may "sweep" the seed from the respective aperture 3320 into that receptacle 3670. In FIG. 38, for example, the rearward flight 3660 will contact the seed before passing the crest or 12 o'clock position 3700. In FIGS. 36 and 37, the rearward flight 3660 will contact the seed after passing the 12 o'clock position 3700. The speed of the endless belt 3640, the speed of the disk 3300, and the type and size of seed being planted will dictate the preferential positioning of the pulleys 3644a, 3644b relative to the apertures 3320 (an adjustment made before operation). Note that in an embodiment with two active seed disks 3300, the positioning may be such that rearward flight 3660 will contact the seed at the 12 o'clock position 3700 to facilitate efficient and effective sweeping of seeds from either disk 3300. In these embodiments, the seed retained on any aperture 3320 contacts no additional surface before being swept by the surface of a flight 3660.

While the movement of the belts 3638, 3640 is configured to synchronize with the forward velocity of the seeding machine 10, the rotational velocity of disks 3300 may be independent of the endless member 3640 and may therefore vary. In particular, the rotational positioning of each disk 3300 can be controlled together or independently to achieve certain relationships between the seed apertures 3320 and the flights 3660 (and consequently the receptacles 3670) of the belt 3640.

In one embodiment, the motors of each disk 3300 can be controlled to "match" the rotational rate of the drive pulley 3642 such that a constant rotational relationship exists between the belt 3640 and each disk 3300. That relationship may be such that each successive receptacle 3670 receives a seed from each successive aperture 3320. In other applications, the rotation rate of the disk 3300 may be related to the rotation rate of the drive pulley 3642 such that a seed transfers from each apertures 3320 into every other receptacle 3670, or into every third, fourth, fifth, etc. receptacle 3670 (i.e., a slower relative rotation of the disk 3300 to achieve a less than one receptacle 3670 to one aperture 3320 relationship). As an example, to achieve an average seed spacing (and consequent spacing of planted seeds) relative to the belt 3640 of every 4.5 receptacles, the motion of disk 3300 can be adjusted to align a first "seeded" aperture 3320 for pressure differential cutoff after three successive receptacles 3670 have passed, permitting the seed to be swept into the fourth successive receptacle 3670. Thereafter, four successive receptacles 3670 are allowed to pass before the next "seeded" aperture 3320 is moved into alignment with the pressure differential cutoff to permit the seed to be swept into the fifth successive receptacle 3670. A repeated sequence in this manner will result in a seed placed in every 4.5 receptacles. Other average seed placements can be accomplished similarly by selectively aligning each seed aperture 3320 with only certain receptacles 3670 of the endless belt 3640.

In yet other embodiments, the rotation rate of the disk 3300 may be related to the rotation rate of the drive pulley 3642 such that two or more seeds from successive apertures 3320 transfer into the same receptacle 3670 (i.e., a faster relative rotation of the disk 3300 to achieve a more than one receptacle 3670 to one aperture 3320 relationship).

In other embodiments, the rotating disk 3300 may be controlled through its stepper or servo motor to angularly accelerate or decelerate at certain points along the rotational path of the rotating disk to coincide or cooperate with the movement of the endless member 3640. Such acceleration/deceleration may be used with any of the aforementioned embodiments, or it may be a separate seed spacing strategy.

For example, the acceleration can accompany a continuous rotational motion of the disk 3300, i.e., constant angular velocity followed by angular acceleration for a duration of time and thereafter a deceleration, in a repeated sequence. In some applications, rotation of the disk 3300 is achieved solely through angular accelerations and accompanying decelerations, with no or minimal or insignificant constant angular velocity motion therebetween. In yet other embodiments, the disk 3300 will cease rotation for a duration of time, angularly accelerate to a desired positioned, and again cease rotation, in a repeated sequence (i.e., accelerate, stop, accelerate, stop, etc.). In yet additional embodiments, the disk 3300 may reverse rotational direction between accelerations. Additional combinations of acceleration, deceleration, constant rotational velocity, forward, reverse, and stopping of motion are contemplated herein. For example, the disk 3300 can thereby be made to effectively "twitch" to achieve the desired placement of a seed within a desired receptacle.

The motion of the disk 3300 can therefore be such that a timed matching between the positioning of the receptacles 3320 and the receptacles 3670 is achieved, as previously described. In other words, the disk 3300 is configured to rotate so that the seeds per unit time rate released by the disk 3300 coincides with the receptacles 3670 presented "per unit time," i.e., presented at the proper position to sweep a seed released from the disk 3300. Accelerations and decelerations of the disk 3300 are accomplished as necessary to achieve the desired aperture/receptacle relationships in this embodiment and in all other embodiments herein described.

To facilitate this synchronization between the apertures 3320 and the flights 3660, one or more sensors may be located within the housings 3130 to detect the rate of travel and/or presence of one or more flights 3660 to index the disk speed 3300 (including the aforementioned accelerations, decelerations, etc.) to the known flight motion or to the spacing between flights 3660 and thereby control the servo or stepper motor of the relevant disk 3300. As an example, the flight position may be referenced relative to the inlet opening 3630 or to any other point within the housing(s) 3130. In other embodiments, one or more sensors may be located within the housings 3130 to detect the rate of travel and/or presence of one or more apertures 3320. Alternatively, if a fixed relationship among the stepper or servo motor of the drive pulley 3642, the drive pulley 3642 itself, and the belt 3640 is known, then control logic can be employed between the stepper or servo motor of the drive pulley 3642 and the stepper or servo motor of the disk(s) 3300 to control the position of the disk(s) 3300 relative to the belt 3640 based on motor speed or motor position (or based on drive pulley 3642 speed or position). Appropriate sensing and feedback may be used to track the motion of the servo or stepper motor rotating the drive pulley 3642 and thereby control the servo or stepper motor of the relevant disk 3300.

Although primarily described as motion of one disk 3300, the above disk motion techniques can be used to control both of the disks 3300 in a single planting operation, i.e., one disk 3300 may be used for a first type of seed for a portion of a field and the other disk 3300 may be used for a second type of seed for another portion of the field or for another field. The above description of disk motion control may also be used with any of the embodiments previously described with respect to FIGS. 3-26.

Various features of the disclosure are set forth in the following claims.

What is claimed is:

1. A seeding machine for a row unit, the seeding machine comprising:
   a seed disk with a plurality of apertures through which an air pressure differential is applicable to retain seed thereon, the seed disk rotatable about an axis to convey seed from a seed reservoir; and
   a seed delivery apparatus comprising
      an elongated housing having a first opening through which seed is received, a second opening through which seed exits, and an elongated interior chamber along which seed is conveyed from the first opening to the second opening,
      a first pulley,
      a second pulley, and
      an endless member driven by the first pulley and/or the second pulley, the endless member movable within the elongated interior chamber of the elongated housing to receive seed from the first opening and convey seed to the second opening, the endless member positioned to sweep across a portion of the seed disk,
   wherein the seed disk and the endless member are both controllable to simultaneously angularly accelerate from a non-zero angular velocity to facilitate movement of a retained seed from the seed disk to the endless member.

2. The seeding machine of claim 1, wherein the seeding machine is configured such that retained seed contacts no surface between the seed disk and the endless belt.

3. The seeding machine of claim 1, wherein the seed disk is controllable to angularly accelerate via a speed or position control motor.

4. The seeding machine of claim 1, wherein the first pulley and/or the second pulley is configured to be driven at a constant rotational speed.

5. The seeding machine of claim 1, further including a drive member operably configured to control the movement of the endless member in cooperation with movement of the seeding machine, wherein the seeding machine is operable in a seeding direction at a first seeding speed and at a second seeding speed, and wherein the drive member is configured to discharge seed with a directional component equal and opposite to the seeding direction and at a speed in the directional component approximately equal to the first seeding speed in a first mode and at a speed in the directional component approximately equal to the second seeding speed in a second mode.

6. The seeding machine of claim 1, wherein the endless member is configured to be driven independently of the seed disk.

7. The seeding machine of claim 1, wherein the endless member is in the form of a flighted belt.

8. The seeding machine of claim 7, further including a sensor configured to sense the position of a flight of the flighted belt relative to the first opening and to provide a signal representative of the sensed position.

9. The seeding machine of claim 8, further including a sensor configured to sense the position of an aperture of the seed disk.

10. The seeding machine of claim 7, wherein the endless member is in the form of a flighted belt with equal spacing between flights.

11. The seeding machine of claim 7, wherein the flighted belt includes a plurality of flights along the length of the endless member, wherein a spacing is defined along the flighted belt between two adjacent flights, and wherein the seed disk is controllable to angularly accelerate cooperatively with movement of the endless member to facilitate movement of more than one retained seed by the endless member from the seed disk into a single spacing.

12. The seeding machine of claim 7, wherein the seed meter disk is controllable to angularly accelerate based at least in part on the spacing between flights.

13. The seeding machine of claim 1, wherein the seed disk is a first seed meter, and further including a second seed disk, wherein the endless belt is positioned between the first seed disk and the second seed disk to sweep across a portion of the second seed disk.

14. The seeding machine of claim 13, wherein the endless belt is positioned to sweep across a portion of the first seed disk.

15. The seeding machine of claim 1, wherein the seed disk is controllable to cease rotation thereof during operation of the endless member.

16. The seeding machine of claim 1, wherein the seed disk is rotatable in a first direction about the axis and in a second direction opposite the first direction, and wherein the seed disk is controllable to accelerate in the first direction cooperatively with movement of the endless member and is controllable to accelerate in the second direction cooperatively with movement of the endless member.

17. The seeding machine of claim 1, wherein the seed meter disk is controllable to angularly accelerate based at least in part on a rotational speed of the first pulley.

18. The seeding machine of claim 17, wherein the endless member is in the form of a flighted belt, and further including a sensor configured to sense the position of a flight of the flighted belt relative to the first opening.

19. A seeding machine for a row unit, the seeding machine comprising:
a seed disk with a plurality of apertures through which an air pressure differential is applicable to retain seed thereon, the seed disk rotatable about an axis to convey seed from a seed reservoir; and
a seed delivery apparatus comprising
an elongated housing having a first opening through which seed is received, a second opening through which seed exits, and an elongated interior chamber along which seed is conveyed from the first opening to the second opening,
a first pulley,
a second pulley, and
an endless member driven by the first pulley and/or the second pulley, the endless member movable within the elongated interior chamber of the elongated housing to receive seed from the first opening and convey seed to the second opening, the endless member positioned to sweep across a portion of the seed disk,
wherein the seed disk is configured to angularly accelerate while the endless member operates at a constant non-zero velocity to facilitate movement of a retained seed from the seed disk to the endless member.

20. A seeding machine for a row unit, the seeding machine comprising:
a seed disk with a plurality of apertures through which an air pressure differential is applicable to retain seed thereon, the seed disk rotatable about an axis to convey seed from a seed reservoir; and
a seed delivery apparatus comprising
an elongated housing having a first opening through which seed is received, a second opening through which seed exits, and an elongated interior chamber along which seed is conveyed from the first opening to the second opening,
a first pulley,
a second pulley, and
an endless member driven by the first pulley and/or the second pulley, the endless member movable within the elongated interior chamber of the elongated housing to receive seed from the first opening and convey seed to the second opening, the endless member positioned to sweep across a portion of the seed disk,
wherein the endless member is configured to accelerate while the seed disk rotates at a constant non-zero angular velocity to facilitate movement of a retained seed from the seed disk to the endless member.

* * * * *